(12) United States Patent
Moores et al.

(10) Patent No.: US 11,597,780 B2
(45) Date of Patent: Mar. 7, 2023

(54) METHODS FOR PRODUCING CHITOSAN

(71) Applicant: THE ROYAL INSTITUTION FOR THE ADVANCEMENT OF LEARNING/MCGILL UNIVERSITY, Montreal (CA)

(72) Inventors: Audrey Moores, Montreal (CA); Thomas Di Nardo, Montreal (CA)

(73) Assignee: THE ROYAL INSTITUTION FOR THE ADVANCEMENT OF LEARNING/McGILL UNIVERSITY, Montreal (CA)

( * ) Notice: Subject to any disclaimer, the term of this patent is extended or adjusted under 35 U.S.C. 154(b) by 0 days.

(21) Appl. No.: 17/264,439

(22) PCT Filed: Jul. 31, 2019

(86) PCT No.: PCT/CA2019/051048
§ 371 (c)(1),
(2) Date: Jan. 29, 2021

(87) PCT Pub. No.: WO2020/024053
PCT Pub. Date: Feb. 6, 2020

(65) Prior Publication Data
US 2021/0309764 A1 Oct. 7, 2021

Related U.S. Application Data

(60) Provisional application No. 62/712,500, filed on Jul. 31, 2018.

(51) Int. Cl.
*C08B 37/08* (2006.01)
*C08L 5/08* (2006.01)

(52) U.S. Cl.
CPC .............. *C08B 37/003* (2013.01); *C08L 5/08* (2013.01)

(58) Field of Classification Search
CPC ................................................... C08B 37/003
See application file for complete search history.

(56) References Cited

U.S. PATENT DOCUMENTS

| 4,195,175 | A | * | 3/1980 | Peniston | ............... | C08B 37/003 536/20 |
| 6,310,188 | B1 | * | 10/2001 | Mukherjee | ............ | C08B 37/003 536/127 |
| 9,862,780 | B1 | | 1/2018 | Obaidat et al. | | |

FOREIGN PATENT DOCUMENTS

WO 2007013717 A 2/2007

OTHER PUBLICATIONS

Nemtsev, S. et al "Deacetylation of chitin under homogeneous conditions" Appl. Biochem. Microbiol., vol. 38, No. 6, pp. 609-615. (Year: 2002).*
Cuong, H. et al "High molecular weight and high degree of deacetylation of chitosan . . . " J. Polym. Mater., vol. 34, No. 1, pp. 103-114. (Year: 2017).*
Chen, X. et al "Base-catalysed, one-step mechanochemical conversion ofchitin . . . " Green Chem., vol. 19, pp. 2783-2792. (Year: 2017).*
Di Nardo, T., Deacetylation by Mechanochemistry and Aging as a Pathway to high molecular weight chitosan from chitin. Master's Thesis, McGill University, Apr. 15, 2018.
Di Nardo et al.. Synthesis of high molecular weight chitosan from chitin by mechanochemistry and aging, ChemRxiv, Jan. 30, 2019.
Abdel-Aziz et al., Preparation of low molecular weight chitosan by extracellular enzymes produced by Bacillus alvei, Journal of Applied Sciences Reseach, 2008, vol. 4(12), pp. 1755-1761.
International Search Report and Written Opinion issued in corresponding application No. PCT/CA2019/051048 dated Oct. 3, 2019.
Glentham-Life Science: Product Specification High molecular weight Chitosan GP8689, Jun. 3, 2016, p. 1-1, XP05580283.
Kadouche S. et al., "Low Cost Chitosan Biopolymer for Environmental Use Made from Abundant Shrimp Wastes", Waste and Biomass Valorization, Springer Netherlands, vol. 8, No. 2, Jun. 16, 2016, pp. 401-406.
Margoutidis G. et al., "Mechanochemical amorphization of a-Chitin and conversion into oligomers of N-Acetyl-D-glucosamine", ACS Sustainable Chemistry & Engineering, vol. 6, No. 2, Jan. 9, 2018, pp. 1662-1669.
Supplementary European Search Report issued in corresponding European application No. 1984350.2 dated Nov. 11, 2022.

* cited by examiner

*Primary Examiner* — Leigh C Maier
(74) *Attorney, Agent, or Firm* — BCF LLP

(57) ABSTRACT

Method for producing high molecular weight chitosan comprising milling or grinding chitin and a reagent to produce a chitin/reagent mixture; and aging said chitin/reagent mixture to produce a high molecular weight chitosan. Method for producing low molecular weight chitosan comprising amorphizing chitin; milling or grinding said amorphized chitin and a reagent to produce chitin/reagent mixture; and aging said chitin/reagent mixture producing low molecular weight chitosan.

14 Claims, 10 Drawing Sheets

METHODS FOR PRODUCING CHITOSAN

CROSS-REFERENCE TO RELATED APPLICATIONS

This application is a national phase filing under 35 U.S.C. 371 of International Application No. PCT/CA2019/051048, filed on Jul. 31, 2019, which claims the benefit of U.S. Provisional Patent Application No. 62/712,500, filed on Jul. 31, 2018. The contents of the aforementioned applications are incorporated by reference in their entirety herein.

TECHNICAL FIELD

Methods for producing chitosan from chitin, more specifically although not exclusively for producing high molecular weight chitosan and/or low molecular weight chitosan, and chitosan thus produced.

BACKGROUND

Biopolymers are triggering intense research interest for they are envisaged as renewable sources for materials and molecules. Chitin is the most abundant naturally produced polymer with yearly production levels in the billions of tonnes. It is a natural polysaccharide composed of β-(1-4)-linked 2-deoxy-2-acetamido-D-glucose units. Its amide functionality constitutes an interesting manifold for functionalization and applications. Chitin may be deacetylated to afford chitosan, an added-value polymer with greater manipulability and solubility in water than chitin due to its free amine group. Chitosan has been developed into many functional materials from biocompatible compounds to every day commodities. Chitosan membranes feature tunable permeability to sodium chloride, glucose, tyrosine and bovine serum protein. Chitosan has also been investigated for protein delivery, with both bovine and human serum albumin. Successful chondrocyte growth onto chitosan scaffolds as well as fibroblast cell attachment and proliferation show promise for tissue growth.

Water treatment with low concentrations of chitosan of 0.8 wt % or less, completely eliminated bacterial contaminations. The use of chitosan hydrogels in drug delivery, chitosan encapsulated quantum dots for anti-cancer drug delivery and controlled drug release has also been investigated. Carboxymethyl chitosan has been used in cosmetics as a thickening agent due to its high viscosity and large hydrodynamic volume. Packaging made from chitosan shows great promise due to its biodegradability and improved tensile strength when prepared by evaporation method. Chitosan's ability to chelate many metals, due to its amine functional group, allows it to be used as a heterogeneous catalyst support for organic transformations. Across its many applications, the degree of deacetylation (DDA) (or the percentage of amide functions converted to amine ones), and the molecular weight of chitosan play a major role in tuning its properties. Thus the ability to precisely control these two parameters is essential.

Commercial chitin is most commonly extracted from crustaceans by undergoing a heterogeneous deproteinization process, where the crustacean exoskeleton is treated with NaOH from mild to harsh conditions to remove proteins in the cuticle. The second step to chitin extraction is a demineralization process where the exoskeleton is exposed to dilute hydrochloric acid (HCl) at room temperature. Finally chitin is deacetylated to afford chitosan. All these steps are complicated by the absence of solubility of chitin in most common solvents. Chitin is only slightly soluble in highly polar solvent systems such as N,N-dimethylacetamide/lithium chloride (DMAc/LiCl).

The most common and commercially-used chitin deacetylation method consists of a treatment in a highly concentrated NaOH solution (≥50%) heated for several hours at temperatures above 100° C. and often repeated for multiple cycles to further deacetylate. This affords chitosan with good DDAs and medium sized molecular weights between 80 to 800 kDa.

Other methods have been explored in an effort to develop a greener and safer process: maceration, steam explosion, freeze-thaw cycles, high temperature and pressure, sonication, microwaving, and planetary milling. These methods typically afford DDA in the 70 to high 90% values. The molecular weights of the chitosan thus produced are reported as being typically under 500 kDa. An exception is the high temperature and pressure method where chitin is mixed with a 50% NaOH solution and heated to 120° C. from 3-24 hours in an autoclave at 15 psi. The DDA is reported to reach up 90.4% with 50% NaOH solutions while maintaining a molecular weight of 1560 kDa.

Mechanochemistry, the use of mechanical energy to activate chemical transformations, is currently the topic of intense research effort, in particular for biomass conversion. Chitin is no exception and it has been recently revealed that mechanochemistry was particularly effective to this end via the use of planetary milling with a large number of balls resulting in chitosan oligomers with DDA of 76.4% and a molecular weight of 6.3 kDa. Conversion of chitin into N-acetyl-D-glucosamine monomer and dimers with 5.1 and 3.9 wt % respectively has been achieved via milling showing that harsh milling conditions can depolymerize chitin. Accelerated aging has also emerged as a method to access inorganic and organic materials with very low energy input. For chitin deacetylation, low temperature solution aging has been reported and yields highly deacetylated chitosan with ~90% DDA, at the expense of aging times close to a month. Also, although the molecular weight was not formally measured, depolymerization levels above 70% were phenomenologically established by the excellent water solubility of the resulting samples.

In these methods, the depolymerisation of chitin/chitosan by nucleophilic attack of the chitin glycosidic bonds by hydroxide ions occurs simultaneously to deacetylation. While depolymerization is a desired reaction outcome to afford low-molecular weight chitosan, and glucosamine monomers, less work was done towards high molecular weight chitosans (>1,000 kDa). Researchers have explored decreasing temperature and NaOH concentration, but it comes at the cost of a significant increase in time, and overall lower DDA. High temperature and pressure methods can yield highly deacetylated chitosan with high molecular weights although the process is energy intensive and potentially dangerous for scale-up.

As biopolymers such as chitin are sought after as ideal precursors for high-end functional materials, there is merit in exploring avenues to preserve the polymer chain as much as possible. Indeed, high molecular weight polymers feature improved mechanical properties and improved glass transition temperature. Despite its high added value applications, chitin remains a largely underutilized biomass waste.

There is thus a need to develop improved or alternative methods for producing chitosan from chitin.

SUMMARY

From a broad aspect, there is provided methods for producing chitosan from chitin based on deacetylation in a manner to control deacetylation and molecular weight of chitosan.

From another aspect, there is provided a method for producing high molecular weight chitosan comprising milling or grinding chitin and a reagent to produce a chitin/reagent mixture, and aging said chitin/reagent mixture to produce a high molecular weight chitosan.

From yet another aspect, there is provided a method for producing low molecular weight chitosan comprising amorphizing chitin, milling or grinding said amorphized chitin and a reagent to produce a chitin/reagent mixture, and aging said chitin/reagent mixture producing low molecular weight chitosan.

From a further aspect, there is provided a high-molecular weight chitosan comprising chitosan derived from chitin and having a degree of deacetylation (DDA) of more than about 95% and a molecular weight of more than about 1,000 KDa.

From yet a further aspect, there is provided a low-molecular weight chitosan derived from chitin and having a degree of deacetylation (DDA) of more than about 95% and a molecular weight of more than about 4000 Da.

In an alternative aspect, there is provided a method for producing high molecular weight chitosan comprising mechanochemically treating chitin in the presence of a deacetylation reagent to produce a chitin/reagent mixture, and aging said chitin/reagent mixture to produce a high molecular weight chitosan.

In an alternative aspect, there is provided a method for producing low molecular weight chitosan comprising amorphizing chitin, mechanochemically treating the amorphized chitin in the presence of a deacetylation reagent to produce a chitin/reagent mixture, and aging said chitin/reagent mixture to produce a low molecular weight chitosan.

In certain embodiments of any one or more of the preceding aspects, the reagent has a composition suitable for deacetylation of chitin.

In certain embodiments of any one or more of the preceding aspects, the reagent is a base.

In certain embodiments of any one or more of the preceding aspects, the pH of the base is more than 9.

In certain embodiments of any one or more of the preceding aspects, the base is a sodium hydroxide (NaOH) solution.

In certain embodiments of any one or more of the preceding aspects, the chitin to NaOH ratio is between about 1:3 to about 1:5.

In certain embodiments of any one or more of the preceding aspects, the chitin to NaOH ratio is 1:3, 1:4 or 1:5.

In certain embodiments of any one or more of the preceding aspects, the aging of the chitin/reagent mixture comprises humidity aging in a humidity chamber.

In certain embodiments of any one or more of the preceding aspects, the humidity aging is performed at a temperature of about 20 to about 100° C.

In certain embodiments of any one or more of the preceding aspects, the humidity aging is performed at a temperature of about 50° C.

In certain embodiments of any one or more of the preceding aspects, the humidity aging is performed for about 3 days to about 6 days.

In certain embodiments of any one or more of the preceding aspects, the humidity aging is performed at a relative humidity of about 43% to about 98%.

In certain embodiments of any one or more of the preceding aspects, the humidity aging is performed at a relative humidity of 98%.

In certain embodiments of any one or more of the preceding aspects, the aging of the chitin/reagent mixture comprises dry flash heating.

In certain embodiments of any one or more of the preceding aspects, the dry flash heating is performed at a temperature of about 120 to about 150° C.

In certain embodiments of any one or more of the preceding aspects, the dry flash heating is performed for about 30 to about 90 minutes.

In certain embodiments of any one or more of the preceding aspects, the dry flash heating is performed at about 150° C. for about 90 minutes.

In certain embodiments of any one or more of the preceding aspects, said chitin is from any one or more of: shrimp, crab, lobster shell, fly larvae and *Bombyx* eri larvae shell.

In certain embodiments of any one or more of the preceding aspects, milling or grinding the chitin comprises using one or more of a mixer mill, a planetary mill with at least one ball, a jar, a blade grinder, and a mortar and pestle.

In certain embodiments of any one or more of the preceding aspects, the jar is made of one or more steel, zirconia and polytetrafluoroethylene (PTFE).

In certain embodiments of any one or more of the preceding aspects, at least one ball comprises: a zirconia ball or a steel ball.

In certain embodiments of any one or more of the preceding aspects, said chitin is milled for about 5 to about 30 minutes, preferably about 5 minutes.

In certain embodiments of any one or more of the preceding aspects, the method comprises washing said chitosan after the aging.

In certain embodiments of any one or more of the preceding aspects, the method comprises amorphizing the chitin before the milling or grinding of said chitin.

In certain embodiments any one or more of the preceding aspects, amorphizing comprises mechanically working the chitin.

In certain embodiments of any one or more of the preceding aspects, the mechanically working comprises milling for about 30 minutes to about 5 hours.

In certain embodiments of any one or more of the preceding aspects, the amorphizing further comprises milling in the presence of a solid or liquid acid.

In certain embodiments of any one or more of the preceding aspects, the acid is selected from a group consisting of acetic acid, citric acid, hydrochloric acid, sulfuric acid, phosphoric acid, formic acid, benzoic acid, and oxalic acid.

In certain embodiments of any one or more of the preceding aspects, the DDA of the high molecular weight chitosan is 70%-100%.

In certain embodiments of any one or more of the preceding aspects, the molecular weight of the high molecular weight chitosan is 1000 to 1600 kDa.

In certain embodiments of any one or more of the preceding aspects, the high molecular weight chitosan is insoluble in organic and/or water-based solvents.

In certain embodiments of any one or more of the preceding aspects, the DDA of the low molecular weight chitosan is 70%-100%.

In certain embodiments of any one or more of the preceding aspects, the molecular weight of the low molecular weight chitosan is 4000 to 6500 Da.

In certain embodiments of any one or more of the preceding aspects, the DDA is measured by $^{13}C$ magic angle spinning nuclear magnetic resonance (MAS NMR).

In certain embodiments of any one or more of the preceding aspects, the molecular weight is measured by viscometry.

From another aspect, there is provided a method for producing chitosan with a desired property, the desired property including one or more of a given degree of deacetylation (DDA), a given molecular weight (MW), a given solubility and a given viscosity, the method comprising mechanochemically treating chitin in the presence of a reagent to produce a chitin/reagent mixture, the mechanochemically treating comprising one or more mechanochemical parameters selected from: chitin:reagent ratio, time of mechanochemical treatment, and energy of mechanochemical treatment, addition of solvents, and aging said chitin/reagent mixture, the aging comprising one or more aging parameters selected from: prewetting, aging time, temperature, presence of humidity, and relative humidity.

In certain embodiments of the preceding aspect, the method further comprising modifying the one or more of the mechanochemical parameters and aging parameters in order to obtain the desired property.

In certain embodiments of the preceding aspect, the method further comprises one or more of:
decreasing the chitin:reagent ratio to increase DDA,
increasing mechanochemical treatment time to decrease MW,
increasing the energy to decrease MW,
increasing the aging temperature to increase DDA,
increasing aging time to increase DDA,
increasing relative humidity in humidity aging to increase DDA,
increasing aging temperature to decrease viscosity,
prewetting the chitin/reagent mixture prior to aging to decrease viscosity,
increasing aging time to decrease viscosity.

In certain embodiments of the preceding aspect, the method further comprises amorphizing the chitin, the amorphizing comprising one or more amorphisation parameters selected from: time of mechanical treatment, presence of acid during mechanical treatment, and energy input during the amorphisation.

In certain embodiments of the preceding aspect, the method comprises one or more of:
increasing mechanical treatment time to decrease MW,
adding acid to decrease viscosity,
increasing energy to decrease MW.

In certain embodiments of any of the above methods, the methods are solvent-free.

BRIEF DESCRIPTION OF THE DRAWINGS

Reference will now be made to the accompanying drawings.

DETAILED DESCRIPTION

Figure 1:
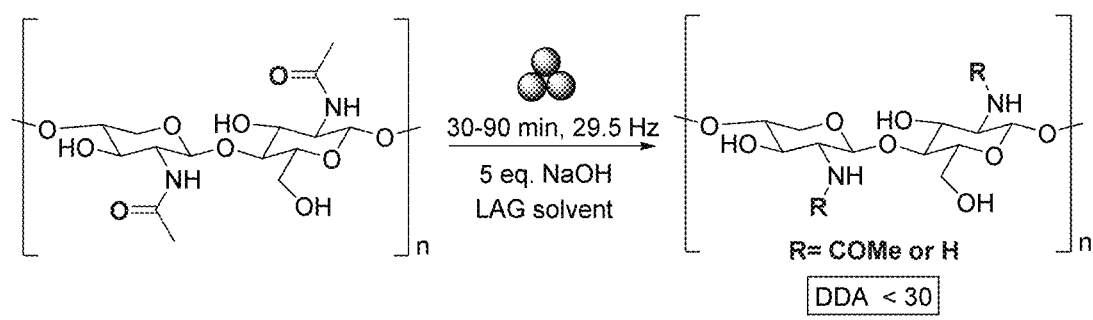
FIG. 1 is a schematic illustration of a method, according to certain embodiments of the present technology, in which chitosan was made from chitin using chitin was treated with NaOH and milled in a PTFE jar with a $ZrO_2$ ball.

In accordance with the present disclosure, there is provided a method of producing high molecular weight chitosan from chitin using mechanochemistry and aging.

There is thus provided a solvent-free method to deacetylate chitin. In certain embodiments, the method comprises first amorphizing chitin then aging with a base, such as sodium hydroxide (NaOH) in a humidity chamber. The absence of solvent, such as water, has several advantages in certain embodiments: it lowers the required quantity of NaOH, it prevents the use of a corrosive slurry during the process (safety) and it limits the generation of waste in the form of a toxic slurry. It also results in a chitosan thus produced which is insoluble in any organic or inorganic solvent which are not ionic liquids.

Inventors have found that the degree of deacetylation of chitin, in order to produce chitosan, can be controlled by one or more of: increasing NaOH molar equivalents; temperature; and time during certain method steps of embodiments of the present technology. It was found that greater than 70% degree of deacetylation (DDA) can be achieved in 6 days at room temperature or in 24 hrs of aging at 50° C. while 95% DDA can be achieved after 3 days at 50° C. Similarly, chitin can be directly deacetylated from shrimp, crab and lobster shell as well as fly larvae and Bombyx eri larvae shell (BEL) that has been pretreated with 1-ethyl-3-methylimidazolium acetate ([$C_2$mim][OAc]) in the same aging process. Aging of crystalline chitin in a humid atmosphere significantly improved deacetylation to 57% in 98% RH. Amorphization of chitin prior to deacetylation increased the extent of deacetylation under the same conditions, showing that greater access to N-acetyl sites on chitin increases the rate of deacetylation.

A degree of deacetylation of 86% was also achieved with a 1:4 molar ratio of chitin to NaOH, which is 20% improvement over other methods found in literature. Using embodiments of the present aging method, DDA is readily tunable from 29 to 95% by changing the NaOH equivalents during the aging process at 50° C. Advantageously, it was found that using aging for deacetylation helps preserve the molecular weight of chitosan by selectively deacetylating rather than depolymerizing. At room temperature, chitosan with a molecular weight in the range of $4.04$-$5.283 \times 10^6$ Da can be achieved by first amorphizing. At higher energy, crystalline chitin can be deacetylated up to 87% DDA with high MW up to $6.88 \times 10^6$ Da.

In prior art methods, the low solubility of chitin in most solvents required a depolymerization step, which limits access to high molecular weight chitosan.

According to certain embodiments of the present technology, chitosan can be obtained from the deacetylation of chitin without requiring a depolymerization step. Certain embodiments of the present method rely on a combination of mechanochemistry and aging, to produce high molecular weight chitosan with minimal use of energy and solvent.

It is demonstrated that the method provided herein is versatile and applicable to a number of chitin sources, including crude crustaceans and insect shells, yielding deacetylation up to 98% and molecular weights up to 20,770 kDa. Chitin deacetylation was measured by magic angle spinning nuclear magnetic resonance and molecular weight was evaluated through by viscosity measurements.

It was also presently discovered that the molecular weight and the DDA of the resultant chitosan can be controlled through control of various method parameters, as follows:

Milling

Treatment of chitin with a combination of mechanochemistry with aging, in the presence of a base (e.g. NaOH), resulted in chitosan with unprecedentedly high molecular weights (MW_(up to 7,720 kDa) and excellent DDA levels (73-95%). At these very high MW values, chitosans, even with DDA of 95% upwards are not soluble under acidic aqueous conditions so a method based on viscometry with 1-ethyl-3-methylimidazolium acetate was used to measure its MW. DDA was calculated by $^{13}C$ magic angle spinning nuclear magnetic resonance (MAS NMR).

High energy milling methods, such as the use of a planetary mill with several dozens of balls, were previously reported to yield very efficient deacetylation of chitin, at the expense, however, of significantly reduced molecular weights. The use of lower energy milling mechanochemical methods was tested, in an effort to obtain chitosan with distinct properties, namely high DDA and high MW. Milling using a Retsch MM 400 mixer mill with a 20 mL polytetrafluoroethylene (PTFE) jar and one 10 mm zirconia ($ZrO_2$) ball was used as a soft solid-state reaction method (see FIG. 1). Typical experimental conditions comprised chitin (105 mg), NaOH, 5 eq. (95 mg) based on glucosamine unit, loaded to a PTFE jar with a $ZrO_2$ ball.

Liquid Assisted Grinding (LAG)

In all methodology development experiments, commercial chitin (DDA=4%) was used as a starting material. Initial attempts at milling chitin with 5 equivalents of NaOH resulted in minor deacetylation (7%) when the samples were milled for 30 minutes and worked up immediately with methanol to remove excess NaOH and sodium acetate by-product (FIG. 1). Increasing milling time, up to 90 min, yielded no greater degree of deacetylation. In an effort to improve deacetylation, the addition of stoichiometric amounts of liquids of <1 μL/mg, also referred to as LAG, was attempted. This method has proved useful for instance for co-crystal formation or metal organic framework synthesis. Dichloromethane, acetonitrile, ethyl acetate ethanol, methanol, and deionized water were tested for their effect in chitin deacetylation (Table 1).

TABLE 1

Mixer-mill based commercial chitin deacetylation experiments in PTFE jar with a $ZrO_2$ ball

| Milling time (min) | NaOH:chitin ratio | DDA (%) | LAG solvent |
|---|---|---|---|
| 30 | 1 | 5 | none |
| 30 | 2 | 6 | none |
| 30 | 3 | 6 | none |
| 30 | 4 | 7 | none |
| 30 | 5 | 7 | none |
| 60 | 5 | 6 | none |
| 90 | 5 | 7 | none |
| 30 | 1 | 7 | Water |
| 30 | 1 | 7 | Ethanol |
| 30 | 1 | 6 | Methanol |
| 30 | 1 | 6 | Dichloromethane |
| 30 | 1 | 6 | Ethyl Acetate |
| 30 | 1 | 4 | Acetonitrile |
| 30 | 1 | 9.9 | Water (10%) |
| 30 | 1 | 14 | Water (20%) |
| 30 | 1 | 11.76 | Water (30%) |
| 30 | 1 | 11.65 | Water (50%) |
| 30 | 5 | 12.4 | Water (10%) |
| 30 | 5 | 23.8 | Water (20%) |
| 30 | 5 | 20.56 | Water (30%) |
| 30 | 5 | 19 | Water (50%) |

The best result obtained with this strategy was 23% DDA while using the 20% deionized water LAG 1:5 chitin:NaOH mixture (Table 1). In practice, chitin is considered to have been converted to chitosan once its DDA reaches 50%, yet, for certain applications, chitosan with a DDA greater than 70% is preferred for improved solubility in dilute acid. This first attempt at soft mechanochemistry and LAG was not conclusive and it was reasoned that the lack of amorphization could be problematic in favoring the reaction.

Pre-Milling/Amorphization

Figure 2:
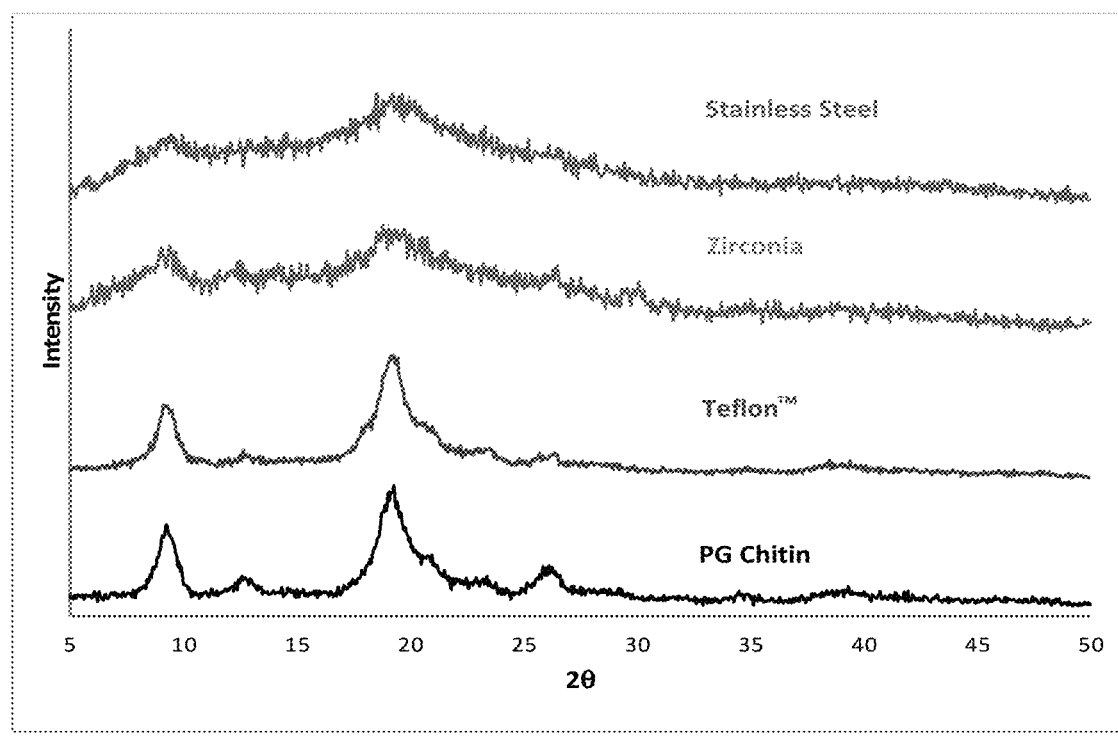
FIG. 2 illustrates XRD spectra of chitin as a control and chitosan obtained by milling chitin in PTFE, Stainless steel or $ZrO_2$ jars, according to certain embodiments of the present technology.
Figure 3:
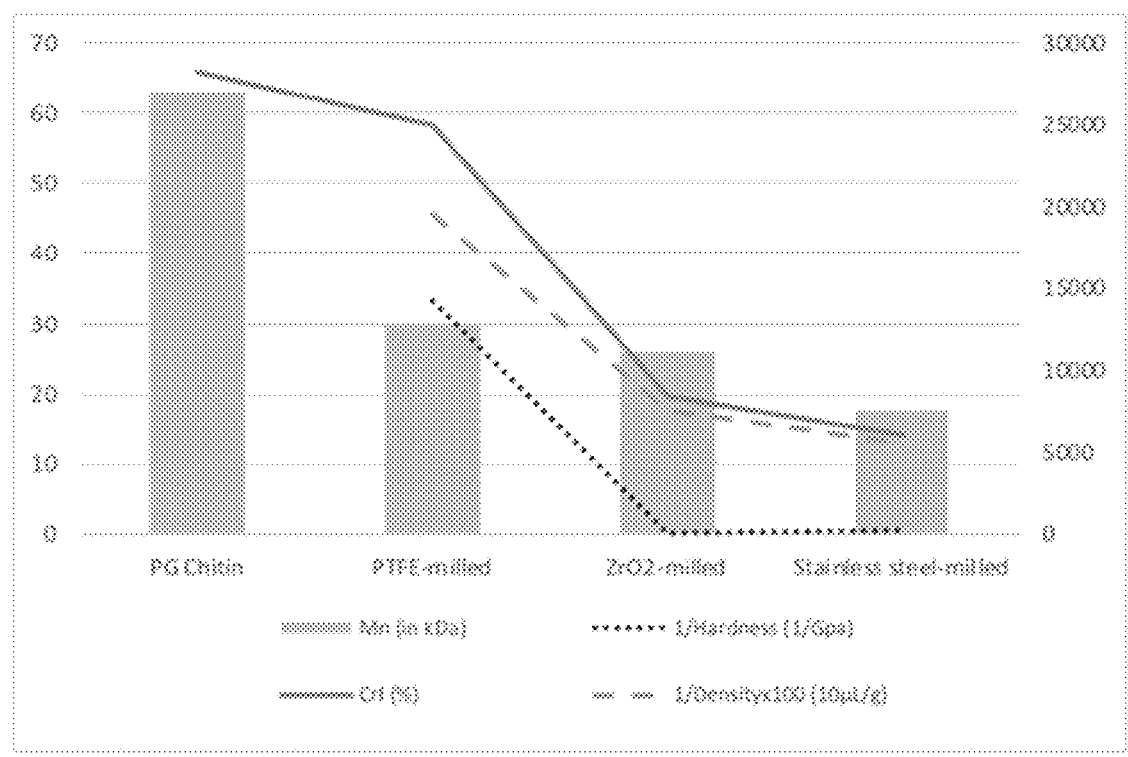
FIG. 3 illustrates a comparison chart of the molecular weight (right ordinate) and CrI (left ordinate) for as-is and amorphized chitin samples with the [1/Vickers hardness] (dotted line–left ordinate) and the [1/density×100] (dashed line–left ordinate) of the apparatus material, wherein amorphization conditions were: RT for 30 min in PTFE, $ZrO_2$ and stainless steel apparatus respectively, according to certain embodiments of the present technology.
Figure 4:
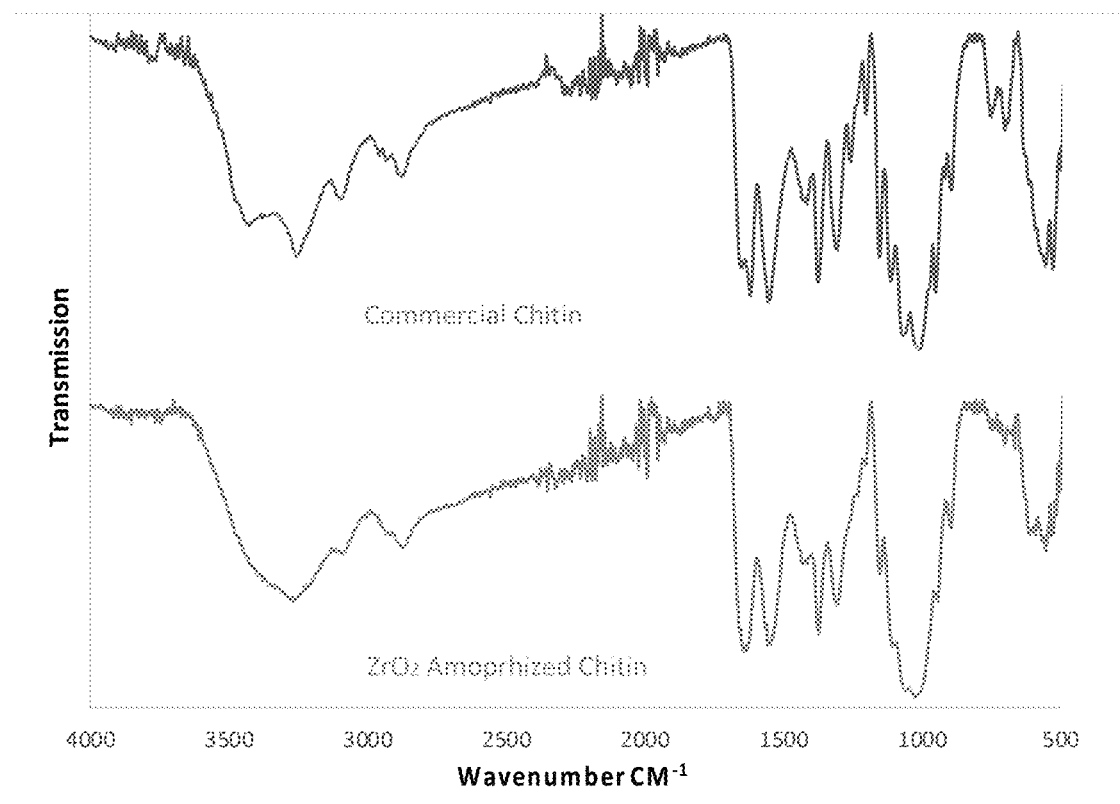
FIG. 4 illustrates a Fourier-transform infrared spectroscopy (FTIR) spectra of commercial chitin pre and post amorphization in a $ZrO_2$ jar with a $ZrO_2$ ball for 30 minutes milling, according to certain embodiments of the present technology.

It is well-known that crystallinity in biopolymers restricts their reactivity. For instance, the acid hydrolysis of cellulose occurs more effectively in amorphous regions. Commercial chitin itself is highly crystalline, which has been shown to slow or even prevent significant deacetylation, including in liquid-phase enzymatic protocols. Chitin can benefit from amorphization to improve access to acetyl sites through increased internal permeability. The effect of dry milling pure chitin was evaluated, in the absence of any reagent, through the crystallinity index (CrI) of the product using X-ray diffraction (XRD). Commercial chitin was first mixer-milled in PTFE using one $ZrO_2$ ball for 30 mins. This afforded very limited amorphization, yielding a crystallinity index (CrI) of 52.4% as compared to 65.8% for untreated practical grade (PG) chitin (FIG. 2). Further milling in PTFE with a zirconia ball for 90 min yielded limited improvement with a CrI of 48.8%. In order to improve impact, harder materials, i.e. steel and $ZrO_2$ jars equipped with one ball of the same material, were tested. In 30 min, significant amorphization had taken place with a crystallinity index of 14.3% for PG chitin milled in stainless steel, 19.7% for PG chitin mill in $ZrO_2$. Vickers hardness and density ($\rho$) can be commonly found in material technical data sheets. For PTFE (5-60 MPa, $\rho=2.2$ g/cm$^3$), $ZrO_2$ (10-14 GPa, $\rho=5.68$ g/cm$^3$) and stainless steel (1-2 GPa, $\rho=7.7$ g/cm$^3$). Both the inverse of the Vickers hardness and the density were correlated to the amorphization measures as CrI (FIG. 3). Indeed denser materials ($ZrO_2$ and steel) are better able to disrupt chitin, a material with high Vickers hardness (245-784 MPa) itself and fairly low density $\rho=1.3$ g/cm$^3$. Amorphization can also be correlated with FTIR, comparing commercial chitin and the zirconia amorphized chitin. The amorphized chitin IR shows loss of peak at ~3450 cm$^{-1}$(OH), merging of the amide peaks at 1663 cm$^{-1}$ and 1612 cm$^{-1}$ as well as loss of the out of plane N—H at 745 cm$^{-1}$ and 690 cm$^{-1}$ (FIG. 4).

Figure 5:
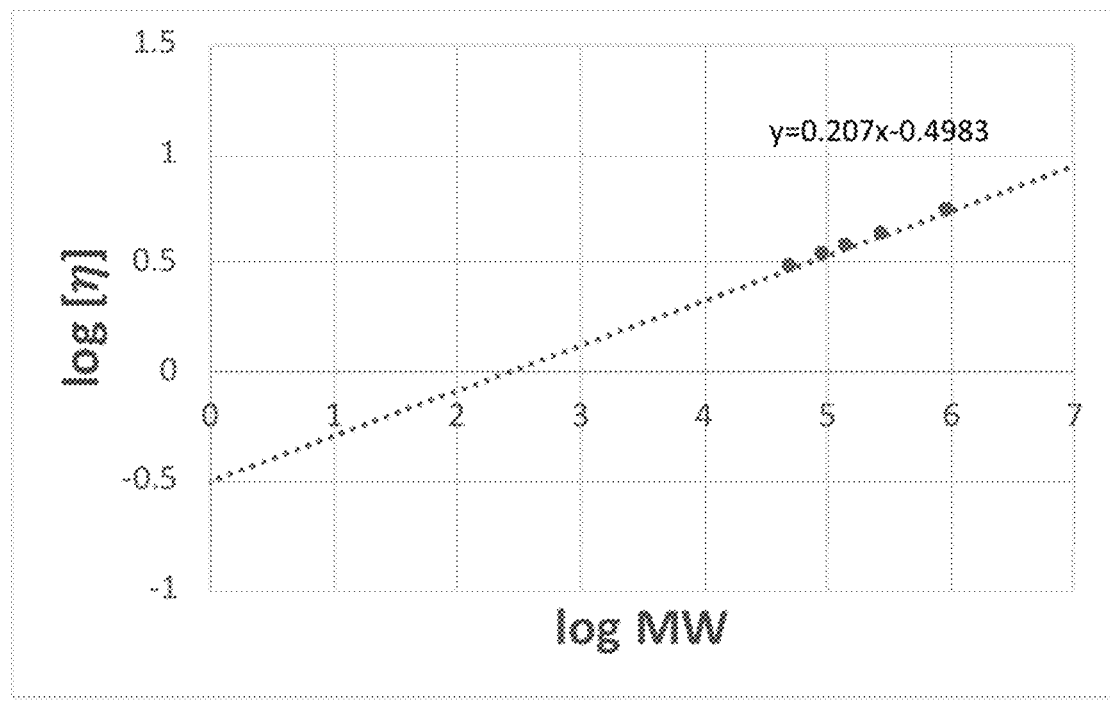
FIG. 5 illustrates log[η] vs log MW plot to determine the Mark-Houwink parameters, α and K for chitin in 1-ethyl-3-methylimidazolium acetate, where the slope is α and the Y-intercept is log K, according to certain embodiments of the present technology.

While good amorphization was achieved in hard material jars, the impact on chitin MW is another important parameter to control. Chitin was thus dissolved in 1-ethyl-3-methylimidazolium acetate and its MW was determined by viscometry. Chitosans of known MW—determined by gel permeation chromatography (GPC)—were acetylated and then used to build a calibration curve. The Mark-Houwink parameters, $\alpha$ and K, were determined to be 0.207 and 0.317 respectively (FIG. 5). With these parameters the MW of chitin samples were calculated using the Mark-Houwink equation (Equation 1).

$$[\eta]=K \cdot MW^{\alpha} \qquad \text{Equation 1}$$

The viscosity average MW (Mv) was converted using Equation 2 to give an estimation of the number average MW (Mn), which is used as the comparative MW in this paper.

$$Mn=Mv[(\alpha+1)\sqrt{(\alpha+1)}]^{-/\alpha} \qquad \text{Equation 2}$$

1-ethyl-3-methylimidazolium acetate proved to be a useful solvent for chitin since other systems such as DMAc/LiCl are relatively poor solvents for native chitin, limiting the solubility of larger polymer chains not to mention being corrosive resulting in possible degradation of the polymer during the dissolution process. Where previously chitin in the range of 5,000 kDa have been measured, it is believed that the ionic liquid approach allows the dissolution of larger polymers chains without degradation.

First, commercial PG chitin as having a MW of 27,000 kDa was measured. With soft milling conditions (one ball, vibrational mill), it was explored if the high MW can be maintained while still amorphizing the material for further treatment. When milled for 30 min in PTFE, $ZrO_2$, and stainless steel, the MW was 12,900, 11,200 and 7,600 kDa respectively (FIG. 3). This method of milling with one ball thus afforded excellent MW, 2 to 3 orders of magnitude higher than previously reported in planetary mill.

Aging

Humidity and Dry Flash heating were assessed as avenues for aging to obtain high MW and high DDA chitosan. The parameters were optimized as follows.

Humidity Aging

Relative Humidity (RH)

The amorphization treatment described above is still fairly intensive and deacetylation conditions were sought which would be as mild as possible. The use of aging was explored, in dry and humid environments since it has been hypothesized that water plays a large role in depolymerization by activating the glycosidic bond for nucleophilic attack in a basic environment. Humidity levels in the samples during aging were monitored thanks to controlled humidity chambers. Salt saturated aqueous solution prepared with $K_2CO_3$, NaCl, and $K_2SO_4$ were able to afford stable 43, 75, and 98% RH environments inside a sealed enclosure, respectively. Pure chitin samples were first amorphized by mixer milling in $ZrO_2$ apparatus (milling ball and jar made of $ZrO_2$) for 30 min, before being mixed with NaOH and milled five minutes further in a PTFE jar with $ZrO_2$ ball to ensure homogeneous mixing. The sample was then aged in the various relative humidity (RH) environments for 6 days at room temperature. Results are shown in Table 2.

TABLE 2

Table of the relative humidity (RH) study of aging of
crystalline chitin for 6 days at 22° C.
with a chitin to NaOH ratio of 1:5

| RH (%) | DDA (%) |
|---|---|
| 43 | 40 |
| 75 | 43 |
| 98 | 60 |

Figure 6:
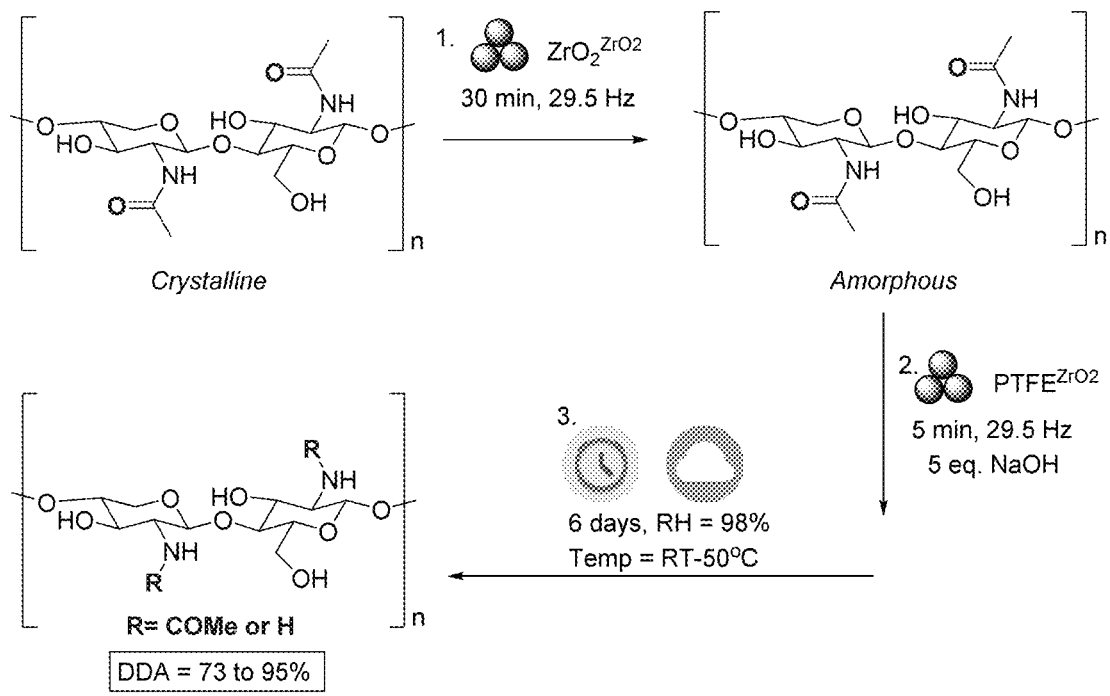
FIG. 6 illustrates methods, according to certain embodiments of the present technology, comprising amorphization/aging of chitin, in which DDA=[H]/([COMe]+[H])×100, and typical experimental conditions were chitin amorphized in a $ZrO_2$ jar with a $ZrO_2$ ball, then chitin and NaOH loaded to a PTFE jar with a $ZrO_2$ ball, followed by aging at 98% RH for 6 days.
Figure 7:
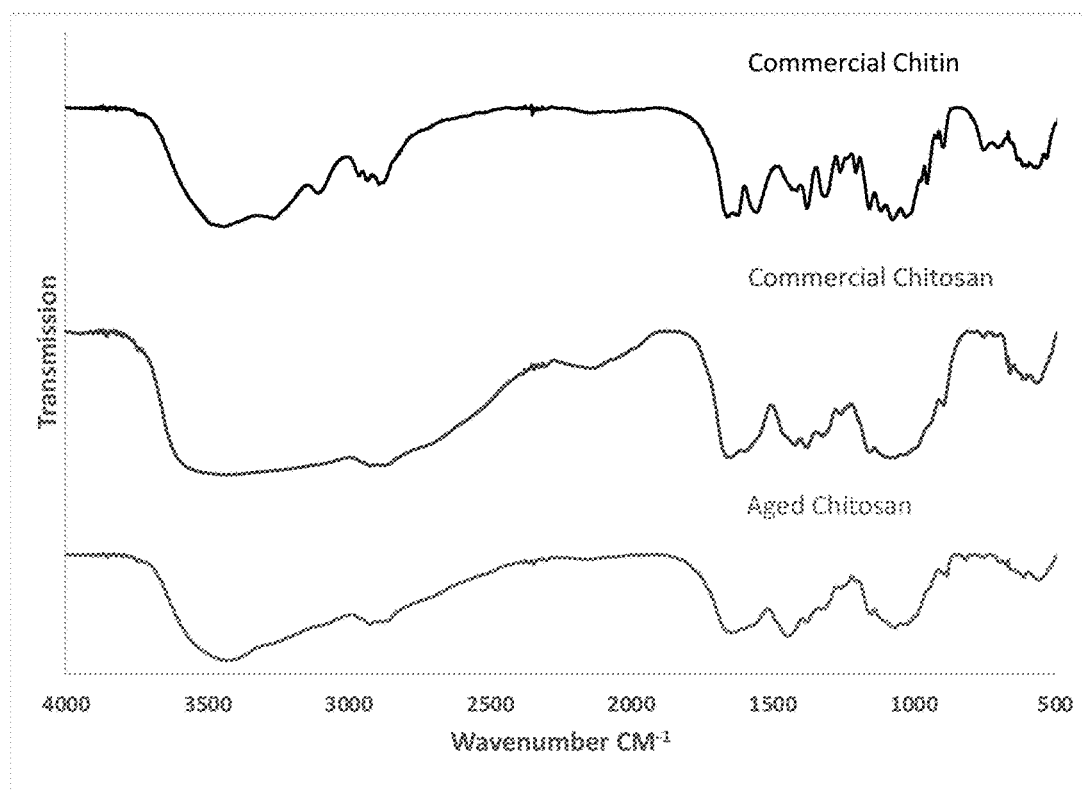
FIG. 7 illustrates infrared spectrometry (IR) spectra of commercial chitin, commercial chitosan, and chitosan produced with an aging process, according to certain embodiments of the present technology, at room temperature (98% RH 1:5 chitin:NaOH), the amide peak at 1655 $cm^{-1}$ being measured in reference to the hydroxyl peak at 3450 $cm^{-1}$.
Figure 8:
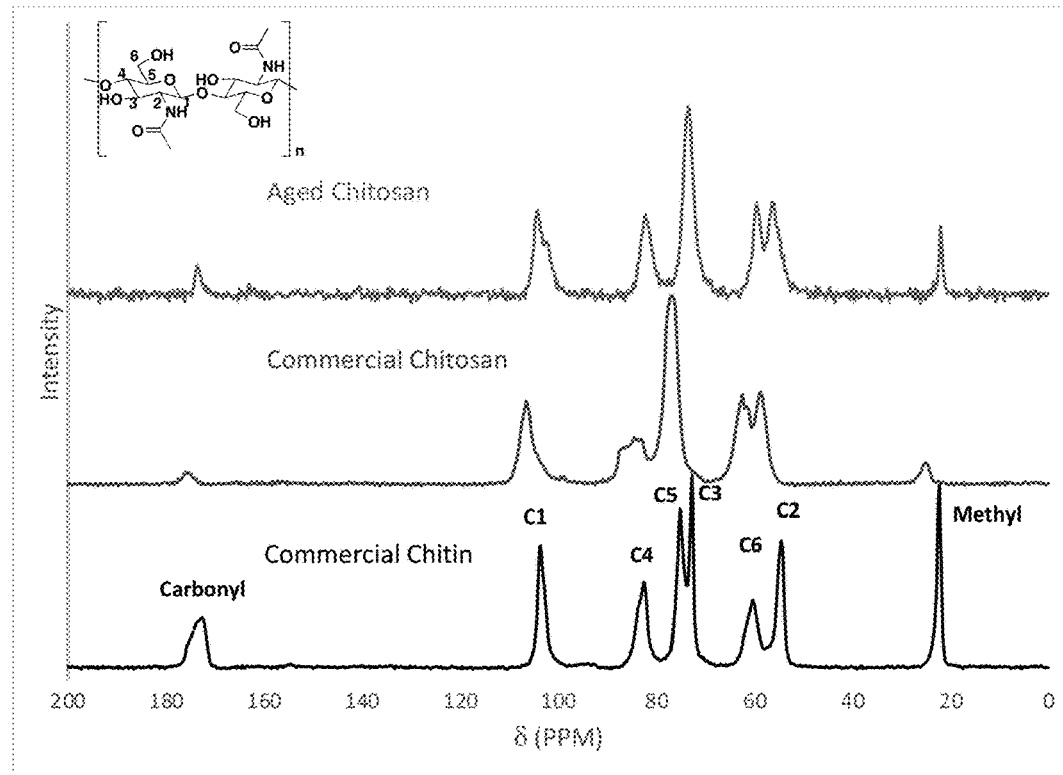
FIG. 8 illustrates solid-State $^{13}C$ NMR spectra of commercial chitin, commercial chitosan, and chitosan produced with an aging process at room temperature, according to certain embodiments of the present technology, in which DDA was calculated by comparing the methyl peak at 22 ppm to a reference C1 carbon peak at 104 ppm.

Interestingly RH of 98% afforded a DDA of 73% (FIG. 6). For this highly deacetylation sample, IR and $^{13}$C MAS NMR spectra are provided as FIGS. 7 and 8. To measure MW, GPC is commonly used for chitosan using an acetic acid buffer. One of the difficulties encountered in this project is that despite having high DDAs the solubility of the aged chitosan was low.

Figure 9:
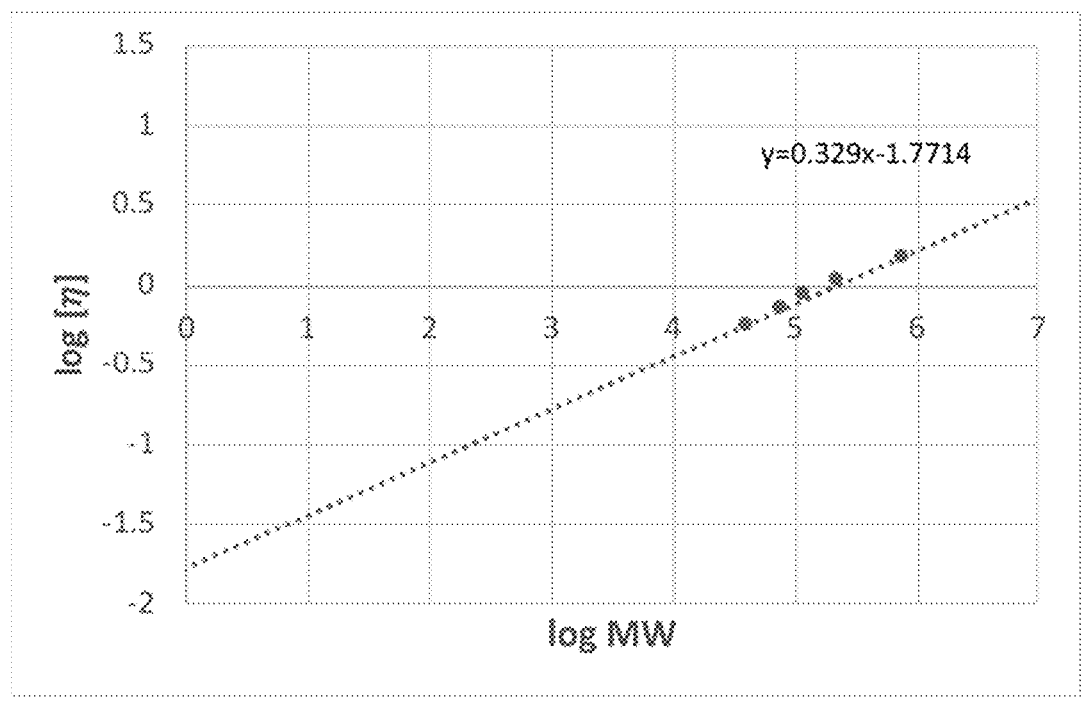
FIG. 9 illustrates log[η] vs log MW plot to determine the Mark-Houwink parameters, α and K for chitosan in 1-ethyl-3-methylimidazolium acetate, where the slope is α and the Y-intercept is log K.

The material recovered from the reaction described in FIG. 6 was left to dissolve in an acetic acid buffer, following known dissolution methods, and then filtered using a 0.45 μm PTFE filter. Less than 5% in weight was dissolved by this method, indicating that most the sample featured MW of high values. The soluble fraction was inspected with GPC, yielding MW of 4-20 kDa. This could be indicative of residual depolymerization. Viscometry was used to determine the MW of chitosan samples. Attempts at dissolution in 1% acetic acid, 2% acetic acid, 0.8% lactic acid and 5% DMAc/LiCl solutions also proved fruitless (FIG. 9).

With this method of GPC, the MW of commercial chitosan samples was measured. These were used to build a calibration curve (FIG. 9) for the viscometric measurements and to determine the Mark-Houwink parameters, α and K, which were determined to be 0.329 and 1.69×10$^{-2}$ respectively and used to calculate viscosity average MW (Equation 1). Samples treated according to the method described in FIG. 6 at RT afforded MW of 4,040 kDa.

Temperature, Aging Time and NaOH Equivalents

In order to further boost DDA while maintaining MW, optimization of reaction conditions was explored by modifying aging temperature, aging time, and NaOH equivalents (Tables 3 and 4).

Figure 10:
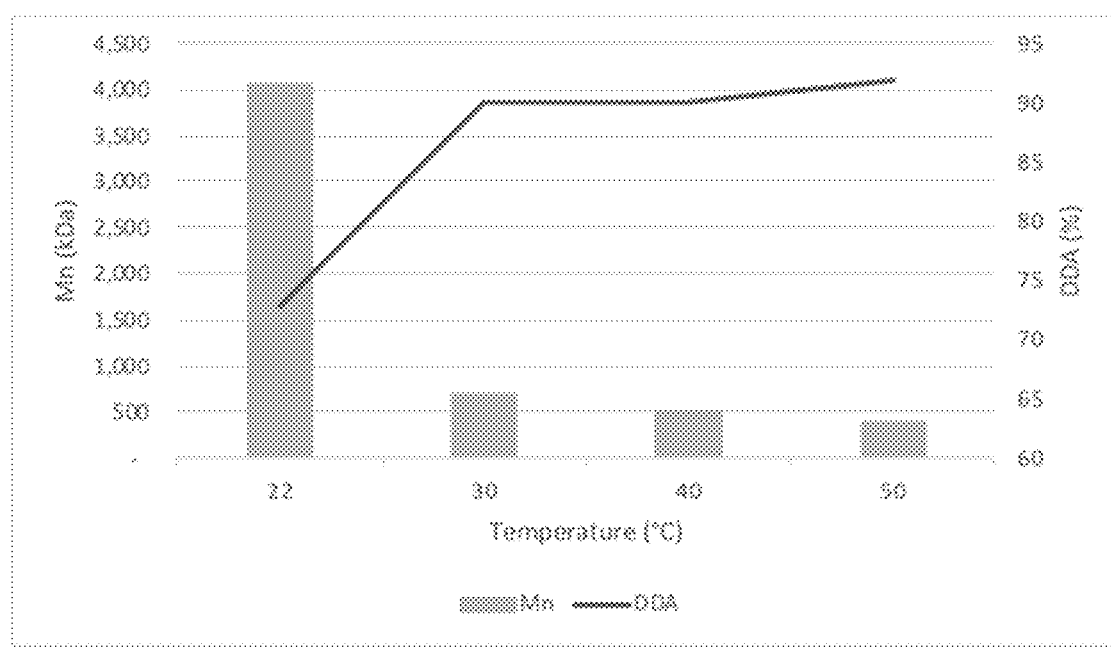
FIG. 10 illustrates the effect of temperature during the aging step in certain embodiments of the present technology, on the number average molecular weight (Mn) of the resultant chitosan and DDA.
Figure 11:
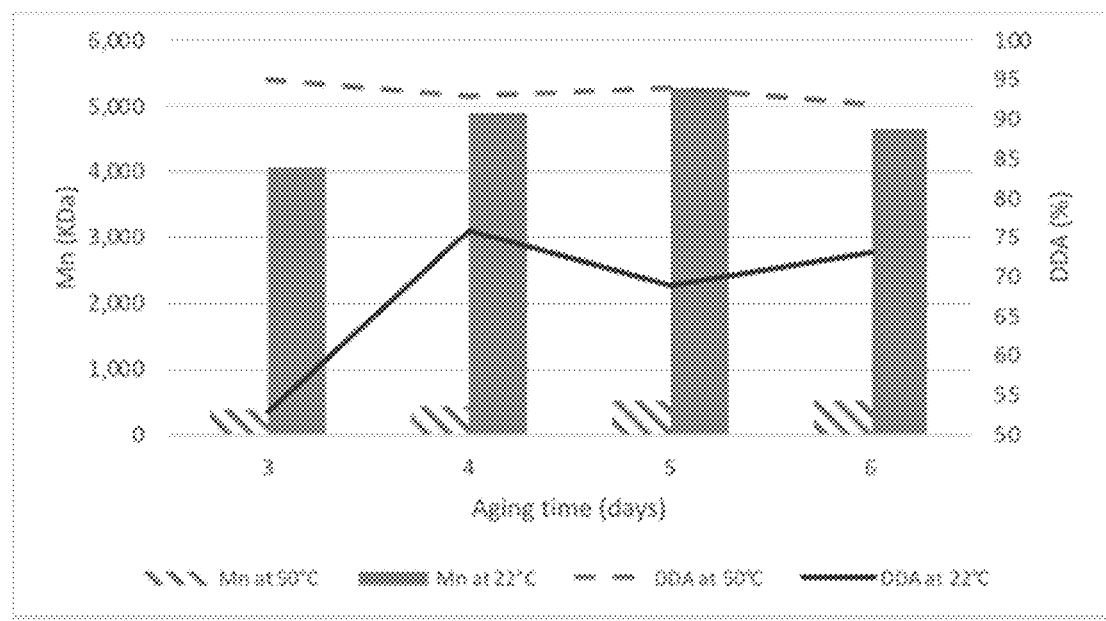
FIG. 11 illustrates reaction kinetics (number average molecular weight (Mn) and DDA) for chitosan produced according to certain embodiments of the present technology for methods with different aging times, performed at 22 and 50° C.

The effect of the temperature was explored during aging under RH of 98% for 6 days (FIG. 10). To modulate this parameter, the humidity chambers were placed in an oven. Raising aging temperatures was expected to accelerate all hydroxy-catalyzed reactions, deacetylation, but also depolymerisation. From room temperature (RT) (22° C.) to 30° C., DDA raised to 90%, while the MW was strongly affected and dropped from 4,040 to 690 kDa. Raising the temperature further up to 50° C., marginally improved the DDA up to 92% and further eroded the MW down to 400 kDa. Then the kinetics of the reaction were studied by looking into aging times of 3, 4, 5 and 6 days, at RT, keeping all other conditions described in scheme 2. Under these conditions, fairly stable MWs ranging from 4,040 to 5,280 kDa were observed (FIG. 11). A sharp increase of DDA from 53% at 3 days to 76% at 4 days, with a plateau thereafter (FIG. 11). At 50° C., DDAs were ranging between 90% and 95% from 3 to 6 days, revealing a much faster kinetic than at room temperature (22° C.) (FIG. 11). The MW was affected too, with values slowly decreasing from 495 to 404 kDa from 3 to 6 days of aging. These values remain higher that typical commercial chitin samples and these results reveal that by modulating the reaction time and temperature, good to excellent DDA can be combined with high to very high MW.

Figure 12:
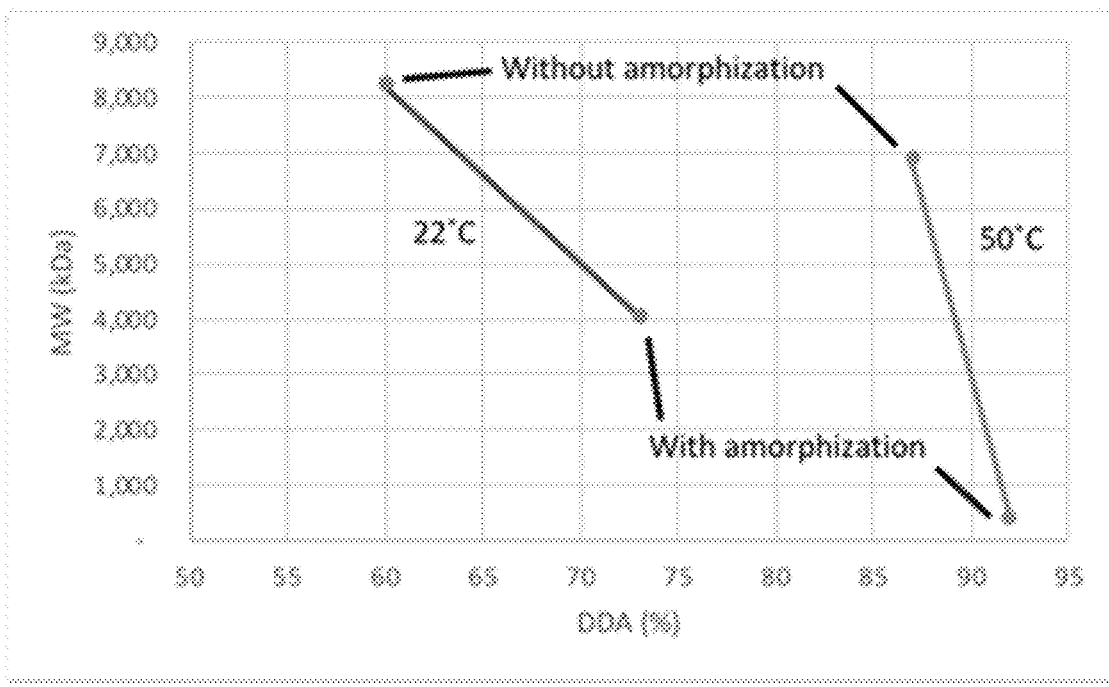
FIG. 12 illustrates effect on molecular weight and DDA of methods of the present technology, with or without amorphization pre-treatment, at 22 or 50° C., wherein the methods were performed over 6 days, using chitin:NaOH ratios of 1:5, with amorphization in $ZrO_2$ milling apparatus for 30 min.

The role of amorphization pretreatment in these aging experiments was further explored, at aging temperatures of 22 and 50° C., in 6 days. FIG. 12 shows the role of amorphization in these experiments. At room temperature, skipping the amorphization pre-treatment provided poor DDA of 59%, compared to 73% with amorphization. Conversely, no amorphization allowed to preserve a really high MW of 8,210 kDa, compared to 4,040 kDa with the extra step. At 50° C. interesting results are observed. No amorphization secured MW of 6,880 kDa and DDA of 87%. This demonstrates that while amorphization is a good method for accelerating deacetylation, it is by no means a sine qua none condition to excellent DDAs. As absence of amorphization secured high MW of 7,720 kDa, a value well above reported methods and known commercial chitosan sources.

TABLE 3

DDA and MW of commercial chitin treated with or
without amorphization pre-treatment
(30 min milling in ZrO$_2$ apparatus) followed
by 3 to 6 days aging at 22 to 50° C., at 98% humidity
and with a chitin to NaOH ratio of 1:5.

| Amorphization pre treatment | Temp. (° C.) | Aging time (days) | DDA (%) | MW (KDa) |
|---|---|---|---|---|
| Yes | 22 | 6 | 73 | 4,040 |
| | 30 | 6 | 90 | 688 |
| | 40 | 6 | 90 | 499 |
| | 50 | 6 | 92 | 404 |
| No | 50 | 3 | 83 | 7,722 |
| | | 4 | 84 | 7,113 |
| | | 5 | 84 | 7,145 |
| | | 6 | 87 | 6,880 |
| | 22 | 3 | 50 | 8,529 |
| | | 4 | 51 | 8,471 |
| | | 5 | 65 | 7,669 |
| | | 6 | 60 | 8,211 |
| yes | 50 | 3 | 95 | 463 |
| | | 4 | 93 | 491 |
| | | 5 | 94 | 440 |
| | | 6 | 92 | 404 |
| | 22 | 3 | 53 | 4,633 |
| | | 4 | 76 | 5,280 |
| | | 5 | 69 | 4,918 |
| | | 6 | 73 | 4,040 |

TABLE 4

DDA and MW of commercial chitin treated with amorphization
pre-treatment (30 min milling in ZrO$_2$ apparatus) followed by
6 days aging at 50° C., at 98% humidity and with a
chitin to NaOH ratio ranging from 1:1 to 1:5.

| Chitin:NaOH ratio | DDA (%) | MW (KDa) |
|---|---|---|
| 1:1 | 30 | Not measured |
| 1:2 | 52 | Not measured |
| 1:3 | 68 | Not measured |
| 1:4 | 87 | 424 |
| 1:5 | 92 | 404 |

Figure 13:
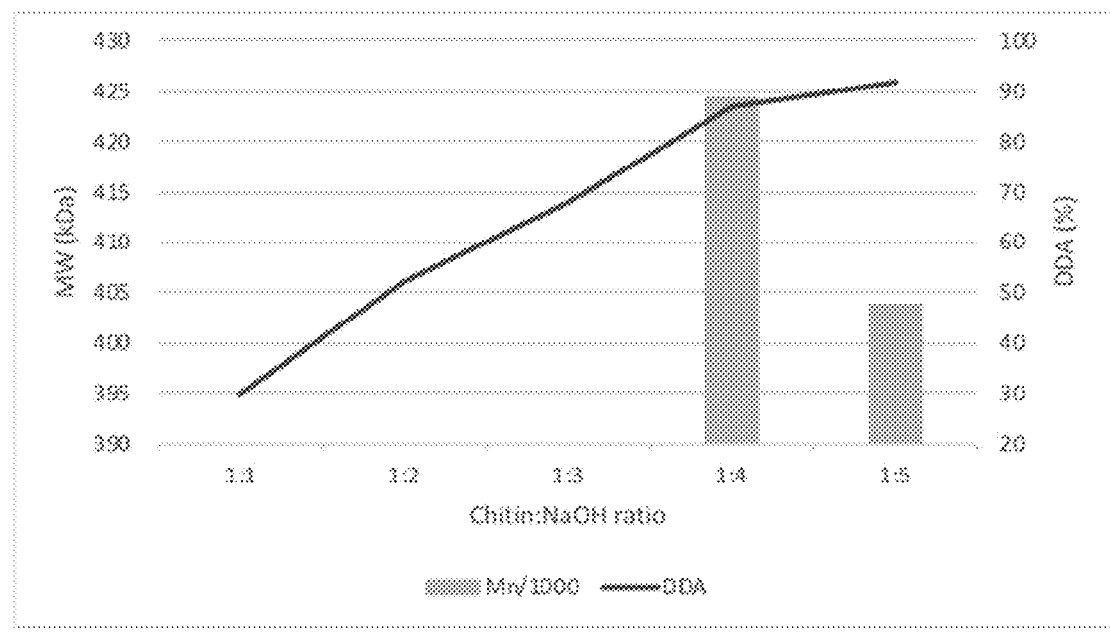
FIG. 13 illustrates the effect of chitin:NaOH ratio on molecular weight and DDA in certain methods of the present technology.

At 98% RH and 50° C. aging, 1:5 chitin:NaOH afforded 95% DDA, while 1:4, 1:3, 1:2, 1:1, yielded 86, 68, 52, and 30% DDA respectively (FIG. 13). Reaching a DDA of 86% with 1:4 chitin:NaOH is an improvement in NaOH equivalents over recent milling deacetylation methodologies, where 1:5 chitin:NaOH mixture was used and a significant decrease compared to conventional methods with 1:40 chitin:NaOH. At 1:4 ratio, the MW is also a bit improved to 424 KDa, which is about a 5% increase from 1:5 ratio.

Figure 14:
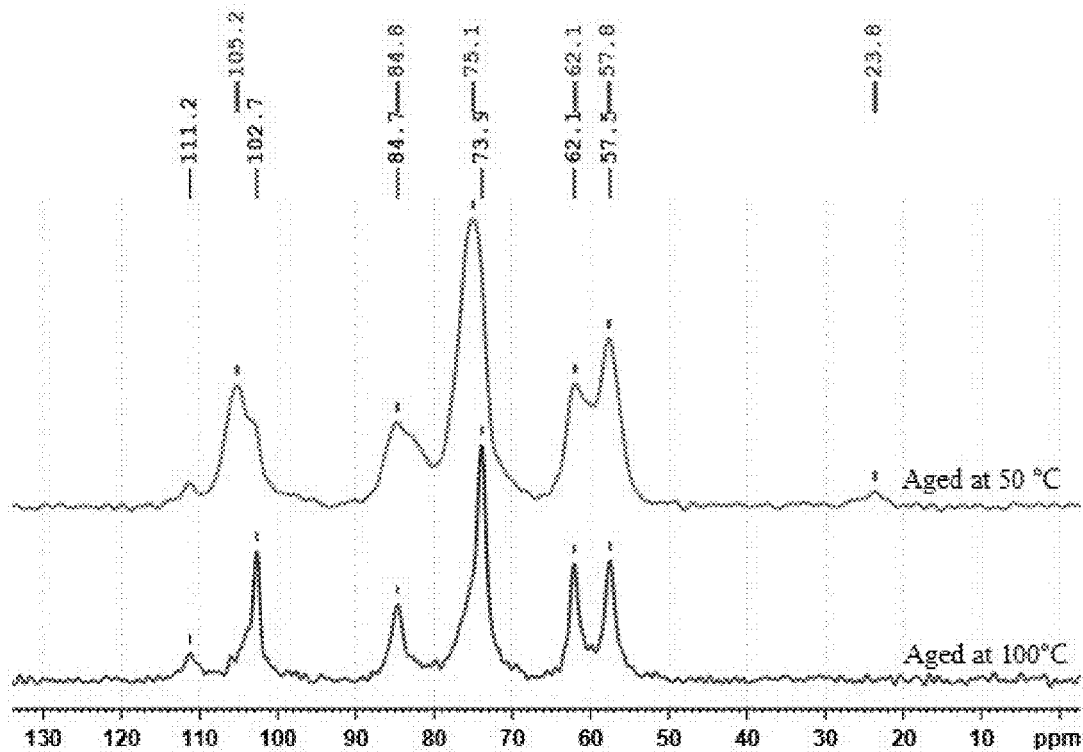
FIG. 14 illustrates a comparison of the $^{13}C$ Solid-state nuclear magnetic resonance (SSNMR) of chitosan samples aged at different temperatures. Both were amorphized and base milled under conditions previously discussed. The sample aged at 50° C. was aged for 3 days, while the sample aged at 100° C. was aged for 24 hours.
Figure 15:
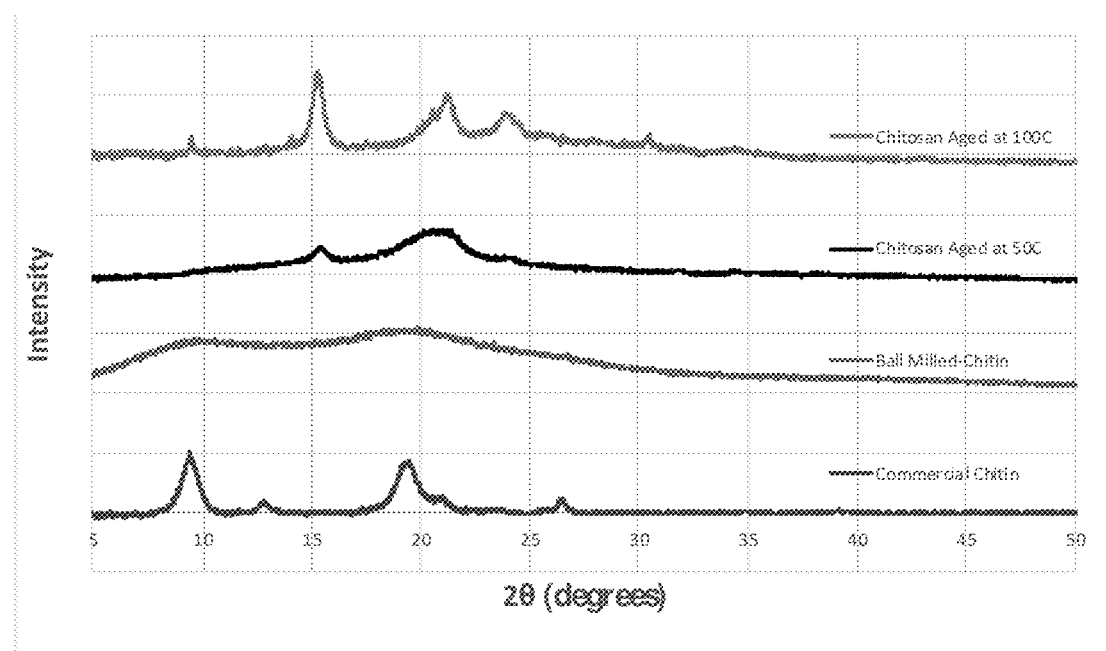
FIG. 15 illustrates PXRDs comparing crystallinity of commercial chitin, ball milled chitin, aged chitosan produced at 50° C. according to certain embodiments of the present technology and aged chitosan produced at 100° C. according to certain embodiments of the present technology.

The effect of temperature on crystallinity was also assessed. Chitosan was prepared by first amorphizing commercial chitin for 4 hours at 400 RPM using 30 g of 5 mm $ZrO_2$ balls in a $ZrO_2$ jar followed by 1 hour of milling with 5 equivalents of NaOH at 400 RPM using 30 g of 5 mm ZrO2 balls in a ZrO2 then aging for 3 days in a humidity chamber at 98% RH while heating to 80° C. or 100° C. followed by methanol washing to remove excess NaOH and sodium acetate. The SSNMR shows narrow peaks indicative of crystalline material (FIG. 14). Heating at higher temperatures between 80° C. and 100° C. affected the crystallinity of the resulting chitosan by 39.1% and 46.5% respectively (FIG. 15).

Dry Flash Heating

Dry Flash heating was also tested as an alternative to humidity aging. In these experiments untreated commercial chitin and NaOH, in a 1:5 ratio, were ground in a planetary mill at 400 RPM for 1 hour with 10×10 mm $ZrO_2$ balls in a $ZrO_2$ jar. The resulting mixture was aged by dry flash heating at a temperature of 150° C. for shorter aging times of 30 and 90 mins. In contrast to aging at 120° C. for 30 mins and 3 days which yielded chitosan with 22% DDA and 53% DDA respectively, aging at 150° C. for 30 mins yielded 42% DDA and for 90 mins yielded 85% DDA, thus demonstrating that these conditions are suitable to deacetylate the chitin.

Grinding

Additional deacetylation methods were tested to assess if grinding in combination with humidity aging would be a sufficient replacement for planetary or mixer milling. In these experiments untreated commercial chitin and NaOH, in a 1:5 ratio, were ground in a Bel-Art micro grinder blade grinder for 5 mins (stainless steel blade rotating at up to 12,000 rpm). The temperature for aging was also increased to 90° C. for a shorter aging time of 18 hours in relative humidity of 98% RH and the results were compared to aging at 50° C. for 3 or 5 days. Aging at 90° C. for 18 hours yielded chitosan with 91% DDA, as compared to 79% and >95% DDA with aging at 50° C. for 3 and 5 days respectively. The results demonstrated sufficient amorphization and mixing are occurring during the grinding and enough energy is being provided to deacetylate the chitin.

In order to improve the viscosity of chitosan while maintaining DDA and the MW, optimization of reaction conditions were further explored by modifying various aging parameters and pre-milling conditions.

Aging Parameters Affecting Viscosity

Temperature

Figure 16:
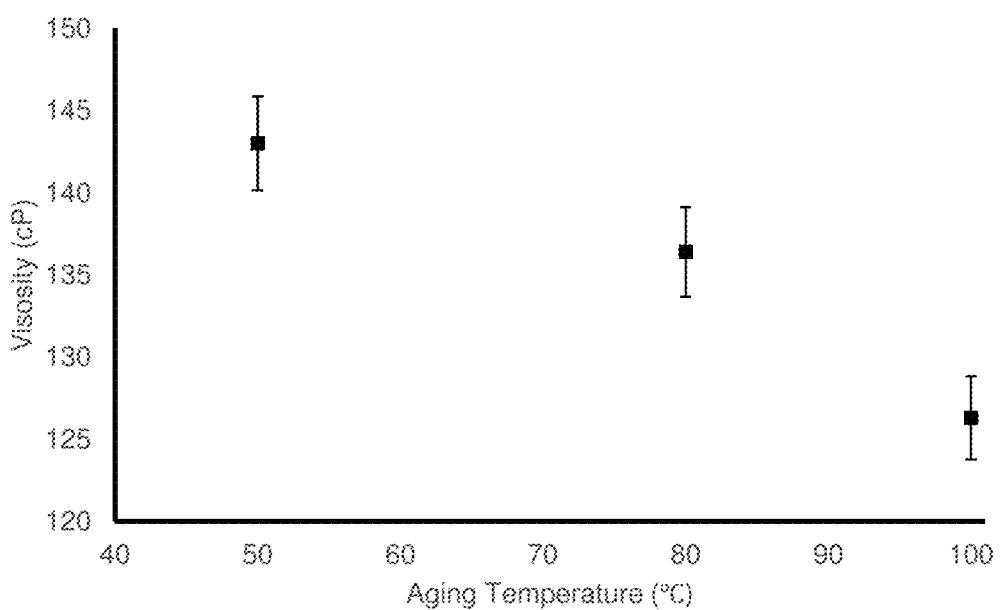
FIG. 16 illustrates the effect of aging temperature on the viscosity of the produced chitosan, according to certain embodiments of the present technology.

The effect of aging temperature on viscosity was tested by increasing the temperature from 50° C. to 80° C. and 100° C., while keeping other parameters constant. Here, chitosan was prepared by first amorphizing commercial chitin for 4 hours at 400 RPM using 30 g of 5 mm $ZrO_2$ balls in a $ZrO_2$ jar followed by 1 hour of milling with 5 equivalents of NaOH at 400 RPM using 30 g of 5 mm $ZrO_2$ balls in a $ZrO_2$ jar, then aging for 3 days in a humidity chamber at 98% RH while heating at various temperatures followed by methanol washing to remove excess NaOH and sodium acetate. The results demonstrated that viscosity decreases with increasing temperatures for aging (FIG. 16).

Pre-Wetting

Pre-wetting during the aging step also decreases viscosity of the polymer solution. Chitosan was prepared by first amorphizing commercial chitin for 4 hours at 400 RPM using 30 g of 5 mm $ZrO_2$ balls in a $ZrO_2$ jar followed by 1 hour of milling with 5 equivalents of NaOH at 400 RPM using 30 g of 5 mm ZrO2 balls in a ZrO2 then adding 0, 800, 1600 mg of water then aging for 3 days in a humidity chamber at 98% RH while heating to 50° C. followed by methanol washing to remove excess NaOH and sodium acetate.

Figure 17:
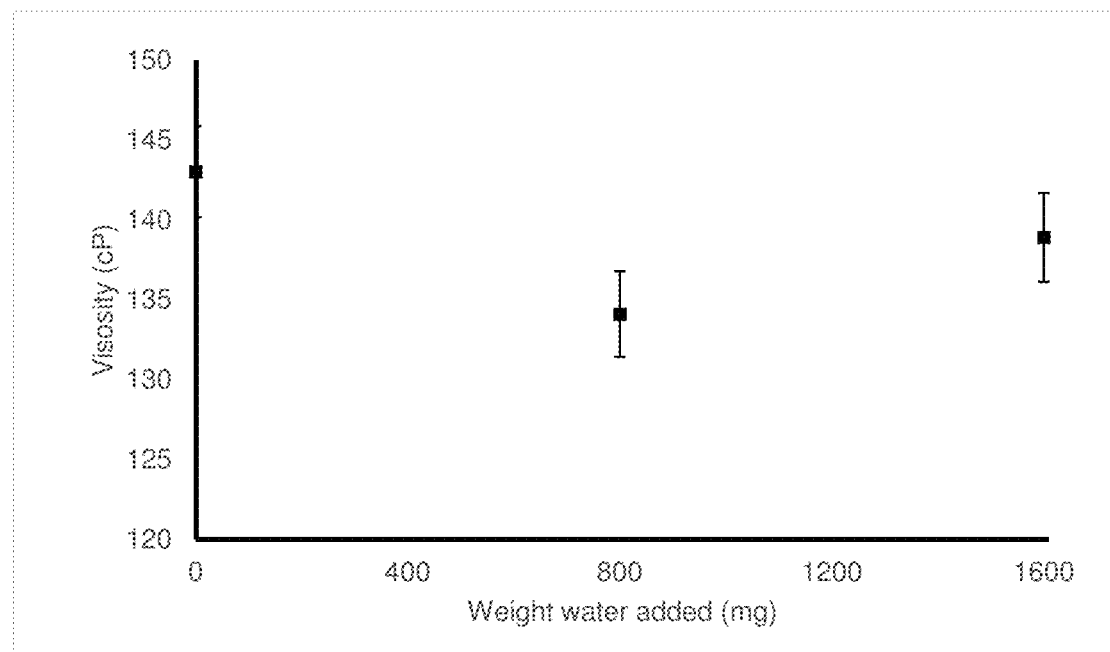
FIG. 17 illustrates the effect of the weight of water added before aging on the viscosity of the produced chitosan, according to certain embodiments of the present technology.

Increasing water content in deacetylation mixture prior to aging decreased viscosity but increasing the water content excessively reduced the effect (FIG. 17). The reduction in viscosity effect is likely a concentration effect where more water decreases the NaOH concentration of the environment.

Time

Figure 18:
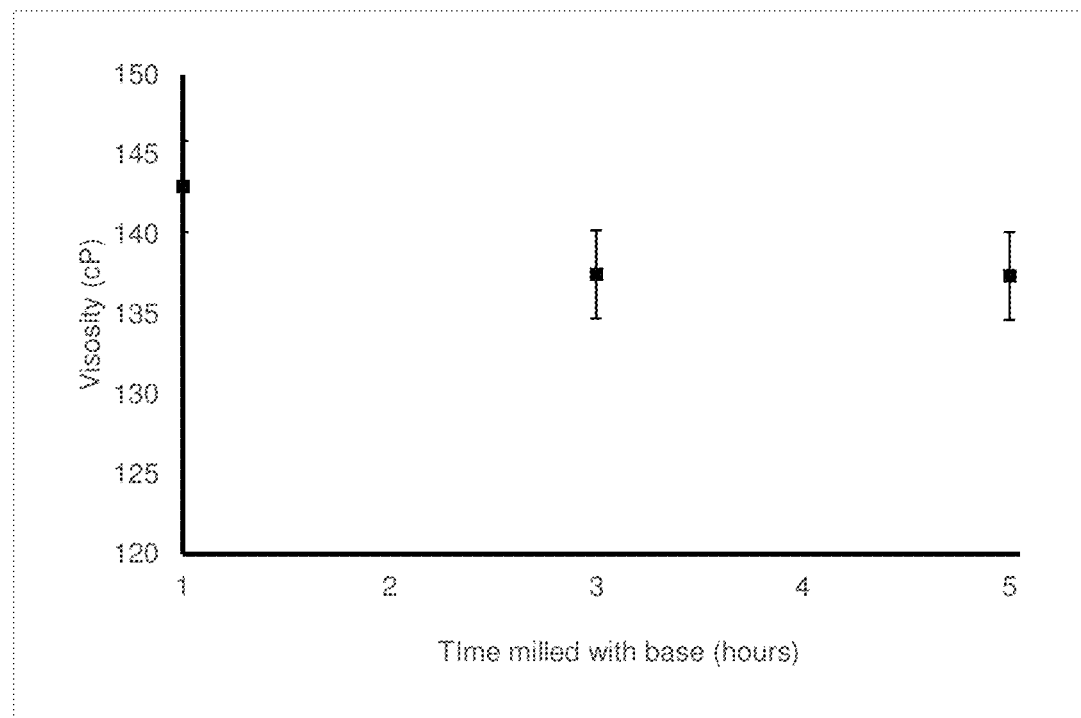
FIG. 18 illustrates the effect of milling time with a base on the viscosity of the produced chitosan, according to certain embodiments of the present technology. Standard amorphization and aging conditions were used.

Increasing milling time resulted in decreased viscosity of the polymer solution. Chitosan was prepared by first amorphizing commercial chitin for 4 hours at 400 RPM using 30 g of 5 mm ZrO2 balls in a ZrO2 jar followed by 1, 3, or 5 hours of milling with 5 equivalents of NaOH at 400 RPM using 30 g of 5 mm $ZrO_2$ balls in a ZrO2 then aging for 3 days in a humidity chamber at 98% RH while heating to 50° C. followed by methanol washing to remove excess NaOH and sodium acetate. Viscosity decreased with greater amount of milling time with base present (FIG. 18).

Pre-Milling/Amorphization Parameters Affecting Viscosity

Addition of Acid

Figure 19:
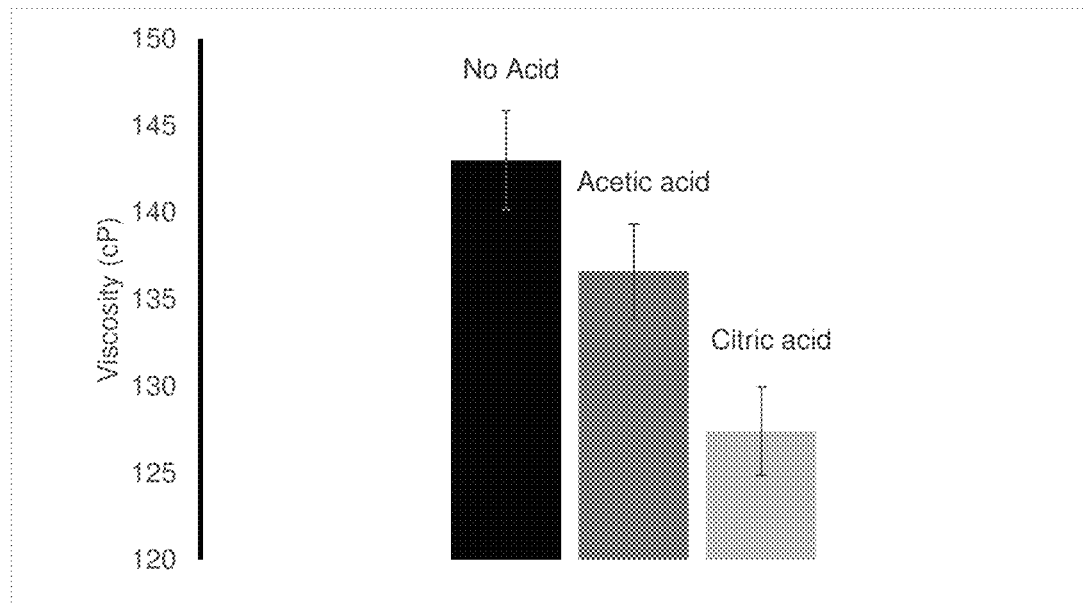
FIG. 19 illustrates the effect of acid pre-milling on the viscosity of the produced chitosan, according to certain embodiments of the present technology.

Addition of an acid to the pre-milling/amorphization step further decreases viscosity of the polymer solution. Chitosan was prepared by first milling commercial chitin with acid (acetic acid, 5 eq. or citric acid 2.5 eq.) for 1 hour at 400 RPM using 30 g of 5 mm $ZrO_2$ balls in a $ZrO_2$ jar followed by 1 hour of milling with 5 equivalents of NaOH at 400 RPM using 30 g of 5 mm ZrO2 balls in a ZrO2 then aging for 3 days in a humidity chamber at 98% RH while heating to 50° C. followed by methanol washing to remove excess NaOH and sodium acetate. The viscosity of the produced chitosan decreased with increasing pKa of the acid (FIG. 19).

To test scale-up feasibility of the process, 10 g of chitin was used in the simplified approach consisting of mixing commercial crystalline chitin with NaOH (1:5 molar ratio) and milled in a planetary mill for 5 mins, followed by aging for 3 and 6 days in 98% RH at 50° C. was used. Either stainless steel or $ZrO_2$ jars were used as indicated, each with 5 balls (10 mm) of the same material. The successful scale-up yielded chitosan up to 89% DDA and 3,769 kDa, where longer aging times yielded higher DDA and lower MW. The effect of the milling media also had an effect, where the higher density stainless steel improved DDA % but also decreased MW (Table 5).

TABLE 5

DDA and MW results on scale-up of commercial chitin in planetary mill [a]$ZrO_2$ jar [b]stainless steel jar

| Aging Time (days) | % DDA | MW (kDa) |
| --- | --- | --- |
| 3 | 75[a] | 3,769[a] |
|  | 85[b] | 3,075[b] |
| 6 | 83[a] | 3,236[a] |
|  | 89[b] | 2,973[b] |

Besides commercial chitin, the method developed and described herein was tested directly on untreated crustacean and arthropod shells. Shrimp, lobster, crab shells and fly larva larvae shells and *Bombyx* eri larvae shell (BEL) were tested, which are all composed of chitin, as well as proteins and $CaCO_3$. All biomass samples were dried, ground and sieved to particles <125 μm, then amorphized for 30 mins in a $ZrO_2$ jar with a $ZrO_2$ ball. BEL samples treated with ionic liquids was also explored in order to swell the chitin for better access and remove some proteins and CaCO$_3$, according to a method previously reported (Husson et al., 2017, Green Chem., 4122-4131). All these samples were mixed with NaOH, milled for 5 min in a PTFE jar with ZrO$_2$ ball, and aged for 6 days at 98% RH and 50° C. For these tests, a biomass:NaOH ratio of 1:5 was used, which means that the chitin:NaOH ratio is higher, because of the presence of proteins and CaCO$_3$.

Shrimp shell reached a DDA of 95%, while lobster, crab and fly larva reached 96%, 98% and 90% respectively (Table 6). Besides having higher ratios of NaOH to chitin, the protein, CaCO$_3$ matrix allows for better access to chitin for deacetylation. Chitin samples extracted from fly larva reached their highest DDA of 78%, when the biomass was pretreated with 1-ethyl-3-methylimidazolium acetate. This lower DDA is expected since the crystallinity of the extracted BEL chitin is higher as it was not amorphized. All direct from biomass chitosans maintained high MW after deacetylation.

TABLE 6

DDA and MW results on commercial chitin, crustacean and arthropod shells and ionic liquid treated shells

| Chitin source | % DDA | MW (kDa) |
| --- | --- | --- |
| shrimp[a] | 95 | 1,025 |
| lobster[a] | 96 | 4,294 |
| crab[a] | 98 | 10,020 |
| fly larva[a] | 90 | 20,770 |
| BEL[b] | 74 | 5,778 |
| Pretreated BEL[b] | 78 | 6,808 |
| Deproteinized BEL[b] | 72 | 8,675 |
| Pretreated deproteinized BEL[b] | 60 | 1,865 |

Production of Low MW Chitosan

Low molecular weight chitosan was also produced by certain embodiments of the present methods. Broadly, treatment of chitin by amorphization (e.g. by pre-milling), milling/grinding, and aging, resulted in low molecular weight chitosan. Advantageously, certain embodiments of the present methods required less energy to produce such a low MW chitosan.

More specifically, sample low MW chitosan was prepared using the pre-treatment (amorphization), milling and aging methods as described above, and with a modification of the amorphization step in which chitin was milled for one hour with acetic acid (5 equivalent) or citric acid (2.5 equivalent). After the process, the resulting powders were dissolved in 1% acetic acid solutions, which were filtered by suction through 2.5 µm paper filters followed by syringe filtration through 0.45 µm PTFE filters. In all cases >80% of the mass was part of the filtrate thus in solution. None of these solutions had apparent high viscosity. The molecular weight as analyzed by GPC ranged from 4227 Da to 6065 Da and the produced chitosan was >95% deacetylated.

Figure 20:
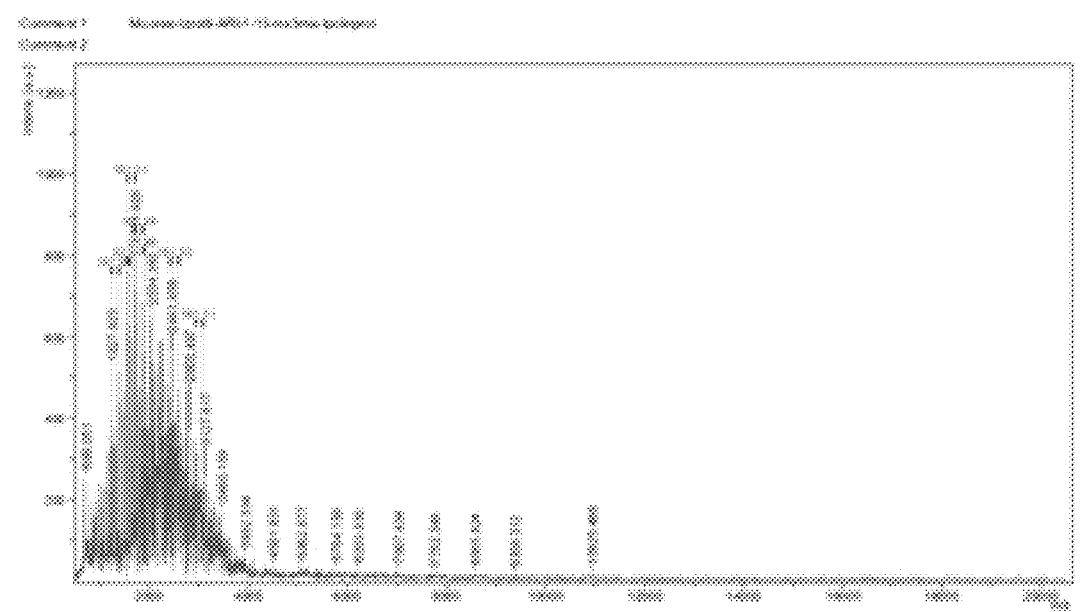
FIG. 20 illustrates MALDI-TOF of aged chitosan produced from 1:10 mixture, chitin:NaOH, aged 3 days at 50° C. in 98% RH, according to certain embodiments of the present technology.

MALDI-TOF corroborated this range as well with an average of 2441 Da compared to 4227 Da for the same sample (FIG. 20).

EXAMPLE I

Chemicals and Methods

Practical grade chitin, low, medium, and high molecular weight chitosan, acetic acid-d$_4$ (≥99.5% D) were purchased from Sigma-Aldrich Co. LLC (St-Louis, Mo.). Medical grade chitosans were purchased from Bonding Chemical (Katy, Tex.). Atlantic sourced shrimp, lobster, and crab shells were purchased from a local fishery cleaned with distilled (DI) water and air dried before further processing. *Bombyx* eri larvae (BEL) were produced from private insects rearing. After separation by extrusion, the raw chitin was cleaned with DI water, ethanol and acetone and air dried. Deproteinized BEL were obtained with NaOH 1M overnight under reflux and washed with DI water until neutral pH. NaOH micropearls were purchased from Acros Organics (Belgium). Deuterium oxide (99.9% D) was purchased from Cambridge Isotope Laboratories, Inc (Andover, Mass.). Methanol, sodium chloride, sodium acetate, and acetic acid (all reagent grade) were purchased from ACP (Montreal, Qc., Canada). Potassium bromide Spectrosol was purchased from VWR (Mount-Royal, Quebec). Potassium sulfate and potassium carbonate were purchased from Alfa Aesar (Ward Hill, Mass.). 1-ethyl-3-methylimidazolium acetate was purchased from Iolitech (Tuscaloosa, Al). Pullulan calibration Readycal Kit (Mp 180-1 220 000 Da) was purchased from PSS polymers (Germany). Homemade chitosan was prepared by a traditional method[26] for comparison by heating for 3 hours in 50% NaOH solution at 120° C.

Miffing

A Retsch MM 400 was used as mixer mill, with jars made of polytetrafluoroethylene (PTFE), 20 mL, stainless steel (10 mL) or zirconia (10 mL), equipped with balls of zirconia or steel.

Controlled Humidity Chamber

Controlled humidity chambers were used. Three relative humidity (RH) levels were tested (43%, 75%, 98%). The chamber consisted of a 100 mL glass screw top jar. The chamber is filled with 20 mL of saturated aqueous solutions of K$_2$CO$_3$, NaCl and K$_2$SO$_4$, to access 43%, 75%, and 98% RH respectively. An open 4 dram vial, containing the solid state sample, was placed inside the chamber. The overall chamber could be heated by placing in a Fisher Scientific Isotemp oven.

Mixer-Mill Based Chitin Deacetylation Experiments

In a typical experiment, 105 mg of chitin and 95 mg of NaOH (1:5 chitin:NaOH ratio) were combined in a PTFE jar and milled for 30, 60 or 90 minutes with one zirconia ball (10 mm). Milling mixture mass was always maintained to be 200 mg. For example, with a 1:1 chitin:NaOH ratio, 170 mg of chitin and 30 mg of NaOH were used. Post milling, the samples were worked up by washing and filtering with methanol until neutral pH using Whatman filter paper (#1, 55 mm), then air dried.

Mechanochemical Amorphization of Chitin

In a typical experiment, commercial chitin (200 mg) was placed in a zirconia jar equipped with one zirconia ball (10 mm) and milled in a mixer mill for 30 mins in at 29.5 Hz. The resulting powder was used as is for analysis or further mechanochemical or aging treatments.

Chitin Deacetylation Experiments by Aging

For deacetylation, chitin samples are used as is, or after a first step of mechanochemical amorphization. In a typical experiment, 105 mg of chitin and 95 mg of NaOH (1:5 chitin:NaOH ratio) were combined in a PTFE jar and milled for 5 minutes with one zirconia ball (10 mm). The procedure was similar with other chitin:NaOH ratios, and the total reagent mass of solid was kept at 200 mg. The mixture, a very pale-yellow powder was transferred from the jar to an open 4 dram glass vial and aged in a controlled humidity chamber for 1 to 6 days at constant temperatures from room temperature to 50° C. Post aging, the samples were worked up by washing and filtering with 100 mL of methanol until neutral pH using Whatman filter paper (#1, 55 mm), then air dried. Controlled experiments were run exactly as stated above, in absence of NaOH, or in absence of controlled humidity (achieved by sealing the sample in a glass vial during the aging period).

Scale-Up—Chitin Deacetylation Experiments by Aging

For 100× scale-up, commercial chitin (10 g) was milled with NaOH (9 g) in a planetary mill for 5 minutes in $ZrO_2$ (50 mL) and stainless steel (80 mL) with 5 balls (10 mm) of the same material as the jar. The mixture was then placed in a petri dish (115 mm×65 mm) which was placed in a sealed 1 L container containing 100 mL of saturated $K_2SO_4$ salt solution with excess salt. The containers were placed in the oven to age at 50° C. for 3 and 6 days. Post aging, the samples were worked up by washing and filtering with methanol until neutral pH using Whatman filter paper (#1, 55 mm), then air dried.

Pre-Treatment of Biomass Samples

Shrimp, lobster, crab and fly larva shell samples were ground using a Bel-Art Products micro-mill for 2 mins then sieved using U.S.A standard test sieves, where particle <125 μm were collected and used for the deacetylation process. The resulting powder was used as is for further treatment, namely mechanochemical amorphization and aging-based deacetylation.

Ionic Liquid Pretreatment of Biomass Sample

Biomass of BEL were treated with 1-ethyl-3-methylimidazoliumm acetate for 40 mins at 110° C. The chitin suspension was then cooled in an ice bath and washed with deionized water, centrifuged at 10 733 g for 20 mins. The supernatant was removed, the resulting mass was then filtered, re-washed and refiltered.

Control Experiments

A 1:5 chitin:NaOH mixture containing 105 mg of chitin and 95 mg of NaOH was manually ground in an agate mortar and pestle for 1 minute to homogenize. The mixture was then aged in an open vial in 43, 75, and 98% RH at 50° C. and worked up as described previously.

A 200 mg chitin sample was milled for 5 minutes in an PTFE jar with $ZrO_2$ ball. The mixture was then aged in an open vial in 98% RH at 50° C. and worked up as described previously.

A 1:5 chitin:NaOH mixture containing 105 mg of chitin and 95 mg of NaOH was milled for 5 minutes in an PTFE jar with $ZrO_2$ ball. The mixture was then aged in a sealed vial at 50° C. and worked up as described previously.

$^{13}C$ Magic Angle Spinning Nuclear Magnetic Resonance (MAS-NMR)

NMR spectra were recorded on a Varian VNMRS operating at 400 MHz for the solid-state $^{13}C$ acquisition using a 4 mm double-resonance Varian Chemagnetics T3 probe. A contact time of 1000 μs and a recycle delay of 3 s were used to acquire quantitative spectra. 2872 scans were acquired of each sample for a total time of 2.5 hrs. DDA was calculated using a known method.

$^1H$ NMR

NMR spectra were recorded on a Varian VNMRS spectrometer operating at 500 MHz for 1H acquisitions. DDA was calculated using a known method when samples were soluble in dilute acetic acid (Kumar, 2000, React. Funct. Polym., 46: 1-27).

IR

IR spectra were recorded using a Perkin-Elmer Spectrum 400 for 64 scans from 4000 $cm^{-1}$ to 400 $cm^{-1}$ in transmission mode from pressed KBr discs where, 2 mg of sample was mixed with 200 mg of KBr. DDA was calculated by comparing the by comparing the absorption of the amide band at 1655 $cm^{-1}$ and the hydroxyl absorption band at 3450 $cm^{-1}$ as the reference peak using the equation, % N-acetylation=(A1655/A3450)×115.

pXRD

Sample diffractogram was recorded from 5° to 40° on a zero-background plate using a Bruker D8 ADVANCE X-Ray Diffractometer equipped using Cu-Kα (λ=1.54 Å) source. Chitin crystallinity was determined by comparing the entire area of the diffractogram (global area) and the area of the peaks (reduced area). Where % Crystallinity=100−% Amorphous and % Amorphous=[(Global Area−Reduced Area)/Global Area]×100.

GPC

An Agilent Technologies 1260 Infinity II GPC triple detection equipped with Shodex OHpak SB-804 HQ 300×8 mm, 10 μm column was used and was calibrated with a PSS Polymers Readycal Kit pullulan standard in an acetic acid buffer system (0.3M Acetic Acid, 0.2M Sodium Acetate and 0.8 mM Sodium Azide).

Samples were left to solubilize in an acetic acid buffer by shaking at room temperature for two days then filtered through a 0.45 μm PTFE filter. The filter was pre-weighed prior to filtration, then dried and weighed post filtration to determine the amount of insoluble material.

Viscosity

Viscosity was measured as an average of 6 repetitions at 40° incline using Anton Paar AMVn automated micro viscometer with 1.6 mm capillary ad 1.5 mm stainless steel ball at 35° C. Sample viscosity was measured and used determine intrinsic viscosity which was used to calculate MW. A typical sample was prepared by dissolving chitosan or chitin in [$C_2$mim][OAc] in concentrations of 3 mg/mL and lower at 80° C. for two days in a sand bath, yielding a golden amber solution. Since filtration was not possible due to viscosity, the samples were centrifuged at 3000 RPM for 10 minutes to remove any undissolved material. Each sample was measured at 5 decreasing concentrations for determination of intrinsic viscosity. To determine the Mark-Houwink parameters, a calibration curve was built using 5 commercial chitosans of known MW (80 kDa to 800 kDa) prepared in the same manner as described above. For chitin, the known MW chitosans were acetylated using a known method using acetic anhydride. These acetylated chitosan samples were then treated to the same procedure as described for chitosan to determine the Mark-Houwink parameters.

Density

Density was measured using Anton Paar DMA 38 density meter using the method described by the company in the user manual.

While the present description has been described in connection with specific embodiments thereof, it will be understood that it is capable of further modifications and this application is intended to cover any variations, uses, or adaptations, including such departures from the present disclosure as come within known or customary practice within the art and as may be applied to the essential features hereinbefore set forth, and as follows in the scope of the appended claims.

What is claimed is:

1. A method for producing chitosan, the method comprising:
   a) milling or grinding chitin and a reagent to produce a chitin/reagent mixture, wherein the reagent is a base having a pH of more than 9; and b) aging said chitin/reagent mixture to produce the chitosan, wherein the aging is: i) humidity aging performed at a relative humidity of between about 43% to about 98%; or ii) heat aging performed at a temperature of above 120° C.

2. The method of claim 1, wherein the reagent has a composition suitable for deacetylation of chitin.

3. The method of claim 1, wherein the base is a sodium hydroxide (NaOH) solution.

4. The method of claim 3, wherein the chitin to NaOH ratio is between about 1:3 to about 1:5.

5. The method of claim 1, wherein the humidity aging is performed in a humidity chamber.

6. The method of claim 5, wherein the humidity aging is performed at a temperature of about 20° C. to about 100° C.

7. The method of claim 5, wherein the humidity aging is performed for about 3 days to about 6 days.

8. The method of claim 1, wherein the heat aging of the chitin/reagent mixture is performed in a dry atmosphere and for a duration of hours.

9. The method of claim 8, wherein the heating is performed at a temperature of above 120° C. to about 150° C.

10. The method of claim 1, wherein milling or grinding the chitin comprises using one or more of:
a mixer mill,
a planetary mill,
a jar with at least one ball,
a blade grinder, and
a mortar and pestle.

11. The method of claim 10, wherein the jar is made of one or more steel, zirconia and polytetrafluoroethylene (PTFE), and the at least one ball comprises: a zirconia ball or a steel ball.

12. The method of claim 1, comprising amorphizing the chitin before the milling or grinding said chitin by mechanically working the chitin.

13. The method of claim 12, wherein the amorphizing further comprises milling in the presence of a solid or liquid acid, wherein the acid is selected from a group consisting of acetic acid, citric acid, hydrochloric acid, sulfuric acid, phosphoric acid, formic acid, benzoic acid, and oxalic acid.

14. The method of claim 12, wherein the low-molecular weight chitosan derived from chitin has a degree of deacetylation (DDA) of between about 70% and about 100% and a molecular weight of more than about 4000 Da.

* * * * *